[54] ANTIFOULING COMPOSITION

[75] Inventors: Hiroshi Doi, Takarazuka; Osamu Kadota, Toyonaka; Susumu Kohno, Machida, all of Japan

[73] Assignees: Nippon Oil and Fats Co., Ltd.; Denki Kagaku Kogyo Kabushiki Kaisha, both of Tokyo, Japan

[21] Appl. No.: 360,721

[22] Filed: Mar. 22, 1982

[30] Foreign Application Priority Data

| Mar. 23, 1981 | [JP] | Japan | 56-41903 |
| Mar. 24, 1981 | [JP] | Japan | 56-42842 |
| Jul. 16, 1981 | [JP] | Japan | 56-110080 |

[51] Int. Cl.$^3$ ............................................. C08K 5/57
[52] U.S. Cl. ................................. 523/122; 523/122; 523/202
[58] Field of Search ............................................. 523/122

[56] References Cited

U.S. PATENT DOCUMENTS

| 4,018,611 | 4/1977 | Cramer et al. | 523/122 |
| 4,158,001 | 6/1979 | Reuther et al. | 523/122 |

FOREIGN PATENT DOCUMENTS

| 42-71677 | 11/1967 | Japan . | |
| 47-40687 | 4/1972 | Japan . | |
| 49-126902 | 5/1974 | Japan . | |
| 51-14935 | 2/1976 | Japan | 523/122 |
| 905190 | 9/1962 | United Kingdom . | |
| 1172639 | 12/1969 | United Kingdom . | |
| 1405582 | 9/1975 | United Kingdom . | |

Primary Examiner—Joseph L. Schofer
Assistant Examiner—N. Sarofini
Attorney, Agent, or Firm—Flynn, Thiel, Boutell & Tanis

[57] ABSTRACT

Compositions including the dithiocarbamic acid derivative having

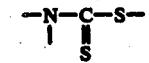

group and at least one organo-tin compound selected from the group consisting of polymers having recurring units containing organo-tin, copolymers which are copolymerized with acryl compounds or vinyl compounds and organo-tin chemicals of

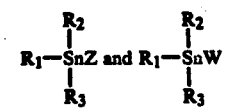

are extremely effective for preventing the adhesion of marine organisms including marine microorganisms. This effect of the said composition is enlarged in the presence of copper compounds. $R_1$, $R_2$, and $R_3$ represent an alkyl or phenyl, cycloalkyl group: Z; monovalent functional group containing sulphur or oxygen: and W; divalent functional group.

10 Claims, No Drawings

ANTIFOULING COMPOSITION

BACKGROUND OF THE INVENTION

FIELD OF THE INVENTION

This invention relates to an antifouling composition for preventing the adhesion of marine organisms, including marine microorganisms, to surfaces.

The adhesion of marine fouling animals such as Barnacles, Hydroides, Membraniporas, Bugulas, Mutilus, and Sponges and marine fouling plants such as Entermorphas, Ulva, Bangia, and the like which grow on the sufaces of ship's hulls at the bottom or water line part, on the inner surface of sea water uptake gates or cooling tubes of thermal or nuclear electric power plants, on the surface of apparatus or culture nets of sea-water culture installations and so on, gives adverse effects such as the reduction in ship velocity or in water-uptake capacity of the plants and the slowdown in growth of the cultured fishes.

In order to prevent these adverse effects, antifouling compositions which contain cuprous oxide, organo tin compounds, organo-tin polymer, thiocarbamates or the like have been hithertofore invented and used. These antifouling compositions are sufficiently effective with respect to the marine fouling organisms such as the above-stated marine fouling animals or plants, which grow to sizes from few to several hundred millimeters so that they can be observed by the naked eye, and therefore, they are actually and widely used.

However, marine microorganisms, of which grown individuals can hardly be seen by the naked eye, were recently found to contribute to the adhesion of the marine organisms, including the above-stated adhesive marine organisms.

Examples of the marine microorganisms are as follows: marine bacterial strains of *Bacillus subtilis*, of genera Achromobacter, Micrococcus, Pseudomonas, Caulobacter, Saprospira, Sarcina, Flavobacterium and the like; marine fungal strains of genera Aspergillus, Nigrospora, Penicillium and the like; and marine diatomaceous strains of genera Navicula, Melosira, Nitzschia, Licmophora, Biddulphia, Thalassionema, Achnanthes, Asteromphalus, Diatoma, Phabdonema, Synedra and the like.

The adhesion of the marine microorganisms causes an increase in the frictional resistance of the ships hull surface which results in excessive fuel consumption and additional running costs.

In the cooling systems of electric power plants, their heat exchangers are reduced in the heat exchange efficiency by the adhesion of the marine microorganisms.

In fish culture nets, many disturbances, such as delayed growth of the fishes due to the insufficiency of oxygen content in the sea water, are caused since inflows and outflows of sea water through the nets are restricted by the adhesion of the said marine organisms on the net cords.

The fouling damage caused by the adhesive marine organisms is initiated at the first stage by the adhesion of these marine microorganisms and then the adhesion of larvae of larger adhesive organisms occurs at the second stage. Therefore, prevention of the adhesion of the marine microorganisms is effective to prevent the adhesion of adhesive organisms thereafter and makes it possible to completely inhibit the fouling.

However, marine microorganisms such as marine bacteria, Marine fungi and Marine Diatoms inherently show considerably stronger resistance to various chemical substances as compared with larvae of Barnacles, Bugulas, Enteromorphas and the like, and conventional antifouling compositions can hardly prevent the adhesion of these marine microorganisms.

SUMMARY OF THE INVENTION

This invention provides an antifouling composition for preventing the adhesion of marine microorganisms and larger adhesive marine organisms, thereby making it possible to effect substantially complete prevention of the fouling caused by them.

This invention is based on the findings that a composition containing at least one of the below-stated polymers containing organo-tin and specified organo-tin compounds into a dithiocarbamic acid derivative having a

group, is extremely effective for preventing the fouling caused by the adhesion of marine organisms including marine microorganisms; and further that addition of an organic or inorganic copper compound (hereinafter referred to as component C) which have a solubility ranging from 0.0001 ppm to 10% by weight at 25° C., 1 atm. in seawater enhances much more the fouling preventing effect.

The antifouling composition of the invention for preventing the adhesion of marine organisms (hereinafter referred to as antifouling composition) is produced by incorporating into the dithiocarbamic acid derivative having

group (hereinafter referred to as Component A) at least one organo-tin compound (hereinafter referred to as Component B) selected from the group consisting of polymers having the recurring units represented by the below-stated general formulas (1)-1 and (1)-11 (hereinafter referred to as recurring units (a) containing organo-tin), copolymers of monomers having the recurring units (a) and at least one of acryl monomers and vinyl monomers which are copolymerizable with the monomer having the recurring units (a): organo-tin chemicals represented by formula (2)-1 or (2)-11; and the balance which is conventional antifouling composition.

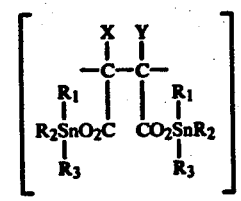

(1)-I

-continued

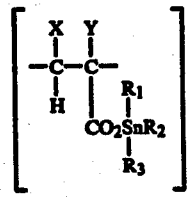 (1)-II

In the formulae $R_1$, $R_2$ and $R_3$ represent an alkyl, phenyl or cycloalkyl group, each having carbon number of 1 to 8, they may be the same or different and X and Y represent hydrogen atoms or methyl groups.

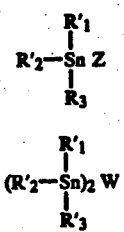

(2)-I (2)-II

In the formulae $R_1'$, $R_2'$, $R_3'$ represents an alkyl, phenyl or cyloalkyl group, they may be all the same or different; Z represents a halogen atom, an ester group, an acyl group a monovalent functional group containing sulfur, a monovalent functional group containing oxygen or an acyl group which is partially substituted by a halogen: and W represents a divalent functional group containing oxygen or sulfur.

The expression of Z and W complies with a nomenclature based on the IUPAC rule. As to Z, the monovalent functional group containing sulfur means a methylthio, ethylthio, or phenylthio group or the like, and the monovalent functional group containing oxygen means a hydroxy group. As to W, the divalent functional group containing oxygen means an oxy group and the divalent functional group containing sulfur means a thio or sulfonyl group or the like.

In addition, the antifouling composition of this invention is produced by incorporating into the component A, the above-stated Component B, an organic or inorganic cuprous or cupric compound having a solubility ranging from 0.0001 ppm to 10% in seawater at 25° C., 1 atm, and additives.

The dithiocarbamic acid derivatives having

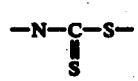

group, which are one of the effective components of the antifouling composition of this invention, include the below illustrated species:

(a); a dithiocarbamate represented by the formula of

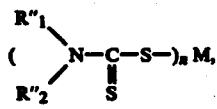

wherein $R_1''$ and $R_2''$ represents a hydrogen atom, a methyl, ethyl, propyl, butyl or phenyl group, or a morpholinyl or piperazinyl group, in which $R_1''$ and $R_2''$ may be the same or different, M represents Zn, Ni, Mn, Cu, Co, Pb, Fe, Sn, Ag, or Hg, and n represents a valency value of M: (as to $R_1''$, $R_2''$, A and M, the same rule applies corresponding to the following.)

(b); a metal salt of dithiocarbamic acid represented by the formula of

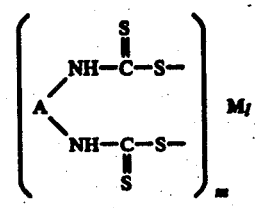

wherein A represents an ethylene, propylene or butylene group: M represents Zn, Ni, Mn, Cu, Co, Pb, Fe, Sn, Hg and the like: and m and l are in the following combination;
m being 1 and l being 2 when M is monovalent,
m being 1 and l being 1 when M is divalent,
m being 3 and l being 2 when M is trivalent, and
m being 2 and l being 1 when M is tetravalent:

(c); a polymer of metal dithiocarbamate represented by the formula of

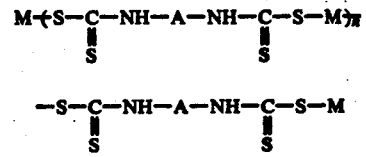

(d); a metal salt of dithiocarbamic acid represented by the formula of

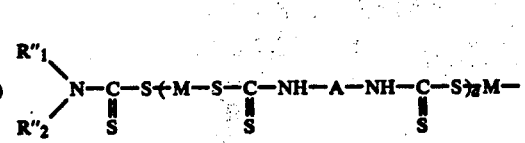

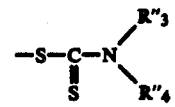

wherein $R_3''$ and $R_4''$ represent a hydrogen atom, methyl, ethyl propyl, butyl or phenyl group, or a morpholinyl or piperazinyl group, in which $R_3''$ and $R_4''$ may be the same or different, a represents a digit number of 1 to 10:

(e) a thiuram disulfide represented by the formula of

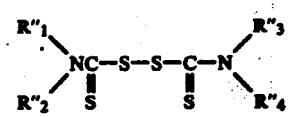

(f) a thiuram monosulfide

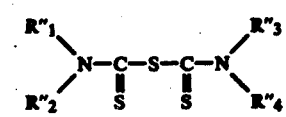

Illustrations are given hereinbelow in order to explain the dithiocarbamic acid derivatives used in the antifouling composition of this invention in more specified form, which however, are not to limit the scope of this invention.

The group (a):

Illustration No. 1
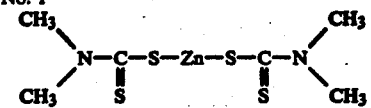

Illustration No. 2
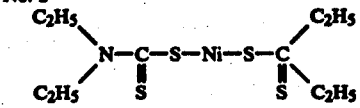

Illustration No. 3
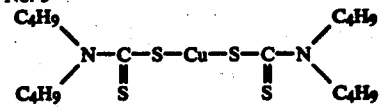

Illustration No. 4
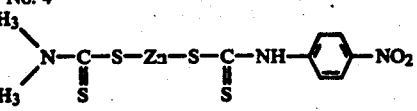

Illustration No. 5
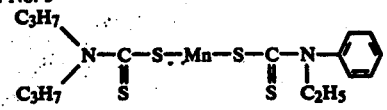

Illustration No. 6
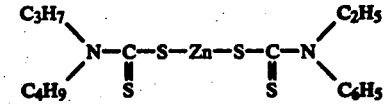

Illustration No. 7
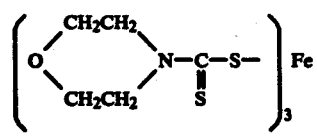

Illustration No. 8
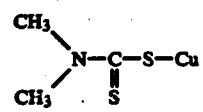

Illustration No. 9
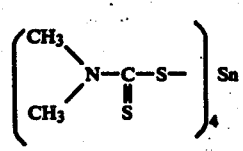

As the group (b):

Illustration No. 10
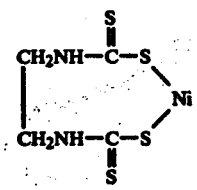

Illustration No. 11
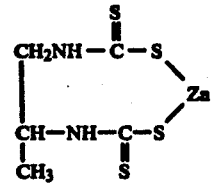

Illustration No. 12
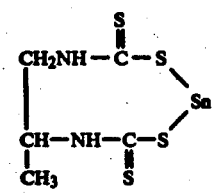

Illustration No. 13
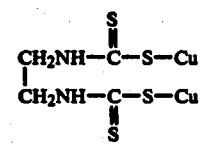

As the group (c):

Illustration No. 14
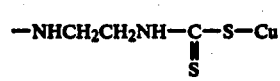

Illustration No. 15
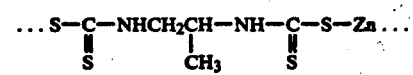

Illustration No. 16
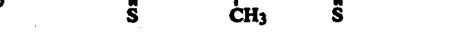
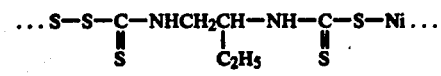

Illustration No. 17
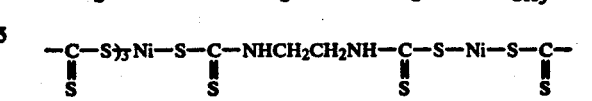
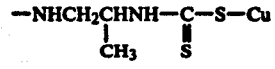

As the group (d):

Illustration No. 18
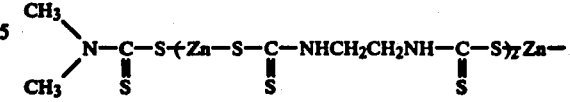

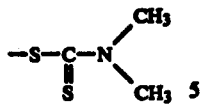

Illustration No. 19

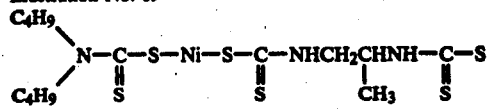

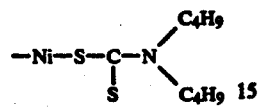

Illustration No. 20

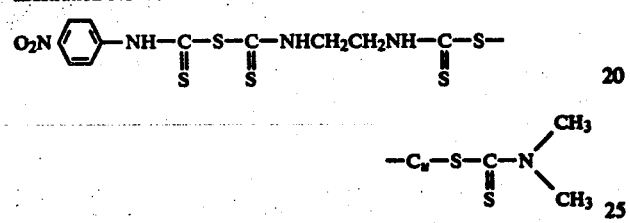

Illustration No. 21

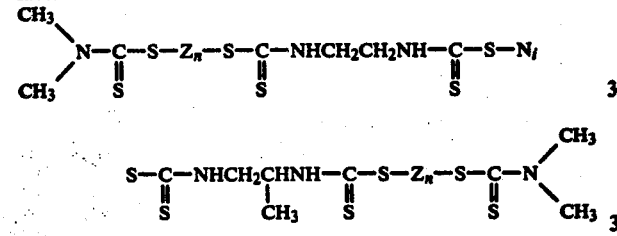

Illustration No. 22

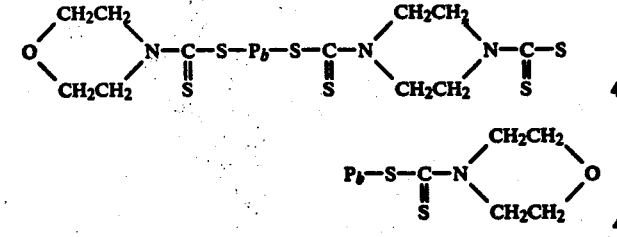

Illustration No. 23

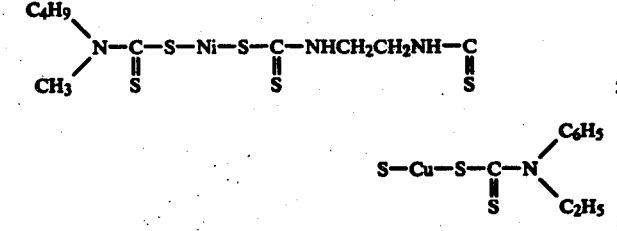

As the group (e):

Illustration No. 24

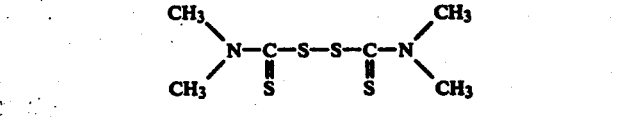

Illustration No. 25

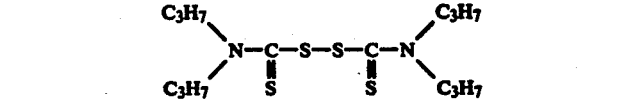

Illustration No. 26

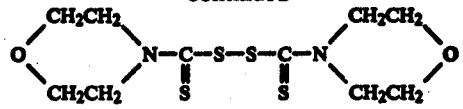

Illustration No. 27

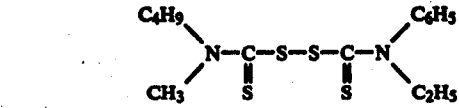

As the group (f):

Illustration No. 28

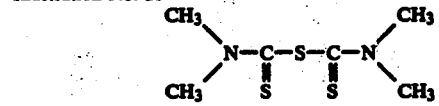

Illustration No. 29

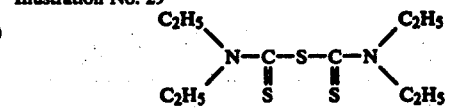

Illustration No. 30

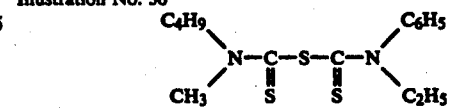

Some Preparation Examples of the Component A are shown hereinbelow.

PREPARATION EXAMPLE 1

Cuprous Substitution Product of Zinc Ethylene Bisdithiocarbamate

One mole of sodium ethylene bisdithiocarbamate is dissolved in 5 l of water, to which 1 mole of an aqueous solution of zinc sulfate is added dropwise under stirring at room temperature. Then, 6.4 g of cuprous chloride and 100 g of ammonium chloride are added. Stirring is carried out to give a precipitate, which is filtered and dried to give 210 g of a cuprous substitution product of zinc ethylene bisdithiocarbamate, a yellow solid.

PREPARATION EXAMPLE 2

Cuprous Substitution Product of a Mixture of Salts of Zinc- and Nickel Ethylene-1,2-Propylene-Bisdithiocarbamate One mole of potassium ethylene bisdithiocarbamate and 1 mole of potassium 1,2-propylene bisdithiocarbamate are dissolved in 10 l of water, to which a solution of 1.67 moles of Zinc sulfate and 0.33 mole of nickel sulfate is added dropwise under stirring. Then 9.4 g of cuprous chloride is added.

Stirring is carried out to give a precipitate, which is filtered and dried to give 510 g of a cuprous substitution product of a mixture A salts of zinc- and nickel ethylene-1,2-propylene-bisdithiocarbamate, a dark brown solid.

PREPARATION EXAMPLE 3

Cuprous Salt of 1,2-n-Butylene-Bisdithiocarbamic Acid 0.1 mole of ammonium 1,2-n-butylene-bisdithiocarbamate is dissolved in 500 ml of water, to which 20 g of cuprous chloride are added to give a precipitate. The precipitate is filtered and dried to give 32 g of cuprous salt of 1,2-n-butylene-bisdithiocarbamic acid, a brown solid.

As the recurring unit containing organic tin represented by general formula (1)-1, bis-(tributyl tin) maleate, bis-(tricyclohexyl tin) maleate, bis-(triphenyl tin) maleate, bis-(tributyl tin) fumarate, bis-(tricyclohexyl tin) fumarate, bis-(triphenyl tin) fumarate, bis-(tributyl tin) citraconate, bis-(tricyclohexyl tin) citraconate, bis-(triphenyl tin) citraconate, bis-(tributyl tin) mesaconate, bis-(tricyclohexyl tin) mesaconate, bis-(triphenyl tin)-mesaconate, bis-(triphenyl tin) mesaconate, bis-(diethyl n-butyl tin) maleate, bis-(ethyl, n-butyl, n-propyl tin) fumarate and the like can be exemplified as representative ones. On the other hand, as the recurring units containing organic-tin represented by general formula (1)-11, tributyl tin methacrylate, tributyl tin acrylate, tricyclohexyl tin methacrylate, tricyclohexyl tin acrylate, triphenyl tin methacrylate, triphenyl tin acrylate, (diethyl, n-butyl) tin methacrylate, (ethyl-, t-butyl-, cyclohexyl-) tin acrylate and the like can be exemplified as representative ones.

Each one of the compounds can be used solely, or in combination with at least one other compound.

Examples of the acryl compounds, vinyl compounds having functional groups and the monomers of vinyl hydrocarbons, which can be copolymerizable with the triorgano tin compound, are acryl compounds such as methyl methacrylate, butyl methacrylate, cyclohexyl methacrylate, phenyl methacrylate, ethyl acrylate, butyl acrylate, octyl acrylate, dodecyl acrylate, cyclohexyl acrylate, phenyl acrylate and the like: vinyl compounds having a functional group such as vinyl chloride, vinylidene chloride, acrylonitrile, methacrylonitrile, vinyl acetate, vinyl butyrate, butyl vinyl ether, octyl vinyl ether, dodecyl vinyl ether, lauryl vinyl ether and the like: vinyl hydrocarbons such as ethylene, butadiene, styrene and the like.

Each one of the said monomers can be used solely, or in combination with at least one other monomer.

As the organo-tin-monomers represented by general formula (2)-1, or (2)-11, which exist in the Component B of the antifouling composition of this invention, tributyl tin fluoride, tripropyl tin chloride, triamyl tin acetate, triphenyl tin fluoride, bis-triphenyl tin α,α'-dibromosuccinate, triphenyl tin dimethyldithiocarbomate, triphenyl tin chloride, triphenyl tin nicotinate, triphenyl tin, ester versatic acid, tricyclohexyl tin monochloroacetate, bis-(tributyl tin)-oxide, bis-(triphenyl tin) oxide, bis-(tricyclohexyl tin) sulfide, bis-(tri-2-ethyl butyl tin) oxide, bis-(tri-sec-butyl tin) oxide, di-n-butyl-, cyclohexyl-tin chloride, ethyl n-butyl phenyl tin fluoride and the like can be exemplified.

Component C, which is one of the effective component of the antifouling composition of this invention, is an organic or inorganic compound of cuprous or cupric compound, whose solubility in seawater is from 0.0001 ppm to 10 wt% at 25° C., 1 atm.

Examples of the compounds are basic cupric carbonate, cupric chromate, cupric citrate, cupric ferrocyanate, cupric fluoride, cupric hydroxide, a cupric salt of quinoline, a copper salt of 8-hydroquinoline, cupric oleate, cupric oxalate, cupric oxide, cupric phosphate, cupric stearate, cupric sulfide, cupric tartarate, cupric tungstate, cuprous bromide, cuprous iodide, cuprous oxide, cuprous sulfide, cuprous sulfite, cuprous thiocyanate, copper naphthenate and the like. Each one of the said compounds can be used solely or in combination with at least one other compound.

The content of the dithiocarbamic acid derivative having

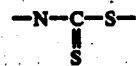

group in the antifouling composition of this invention for preventing the adhesion of marine organisms is not more than 60% by weight, preferably within the range from 0.1 to 50% by weight. The content of the organo-tin compounds which are represented by the general formulae of (1)-1, (1)-11, (2)-1 and (2)-11 and which are used in the antifouling composition of the present invention is not more than 80% by weight, preferably within the range from 1 to 60% by weight.

A content more than the above-stated upper limits adversely affects the workability of application of the composition, while a content less than the lower limits results in a considerable decrease in the effect for the marine microorganisms. When the antifouling composition of this invention for preventing the adhesion of marine organisms further contains an organic or inorganic copper compound, the content of dithiocarbamic acid derivative having

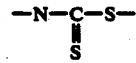

group is not more than 60% by weight, preferably within the range from 0.1 to 50% by weight, the organo-tin compound is not more than 80% by weight, preferably within the range from 1 to 70% by weight. In such a case, the contents of the organic and inorganic copper compounds are not more than 60% by weight, preferably within the range from 1 to 50% by weight A content more than the above-stated upper limits adversely affects the workability of application of the antifouling composition, while a content less than the lower limits results in a considerable decrease in the effect for the marine microorganisms. Into the composition colouring pigment such as titanium oxide, iron oxide, carbon block, cyanine blue, cyanine green, carmine, red chrome yellow, or the like; a dye such as a thiazole dye, an azo dye: an carbonium dye, an acridine dye, a nitroso dye, an indigoide dye, an anthraquinone dye, or the like: an extender auch as talc, mica, calcium carbonate, magnesium carbonate: and an additive such as antisettling agent, an antisagging agent, a levelling agent, a antisegregating agent, an absorbing agent for ultra violet ray can be used with them.

The above-stated ingredients in the antifouling composition of this invention can be also used with other known antifouling compositions which are, for example, benzene hexachloride, 2,4-dichlorophenoxyacetic acid: a triazine compound such as 2-methylthio-4-isopropyl-amino-6-ethyl amino-S-triazine, 2-methylthio-4,6-bisethylamino-S-triazine and 2-methylthio-4-isopropyl-amino-6-methylamino-S-triazine: and a phosphoric compound such as diethyl-p-nitro-m-tolyl-phosphorothionate and dimethyl-S-(N-methyl carbamoylmethyl) phosphorothiolothionate.

Into the composition of this invention, a natural or processed resin such as rosin, shellac and an ester gum, or a synthetic resin such as an alkyd resin, an acryl resin, a vinyl resin, an epoxy resin, and a chlorinated gum resin can be incorporated with the other components.

The composition of this invention may further contain a solvent. Examples of the solvent are a hydrocarbon such as mineral spirit, solvent naphtha, and toluene: a ketone such as methyl isobutyl ketone and cyclohexanone, an ester such as ethyl acetate and butyl acetate: and an alcohol such as n-butanol and isopropyl alcohol are exemplified.

Each one of them can be used solely or in a combination with at least one of the others.

The composition of this invention for preventing the adhesion of marine organisms can almost completely prevent first the adhesion of marine microorganism and also of marine organisms including larger adhesive marine organisms.

Accordingly, when the composition of this invention for preventing the adhesion of marine organsims is applied to coat ship's hulls at the bottom or water line part, inner surfaces of seawater uptake gates or cooling tubes of steam power plants, or nuclear power plants, and apparatus or culture nets of sea-water culture installations, damages such as the reduction in ship velocity or in water uptake capacity of the plants and the slowdown in growth of the cultured fishes can be prevented.

Examples of this invention are illustrated hereinbelow with Comparative Tests to explain the merits of this invention.

In the Examples and Comparative Tests, the term "part" shall mean "parts by weight".

PREFERRED EMBODIMENTS OF THE INVENTION

Components used in the Examples and Comparative Examples are numbered bearing Preparation Example No. in Table 1 wherein R represent a group or groups, M represent a metal and n is an integer, in the general formula of

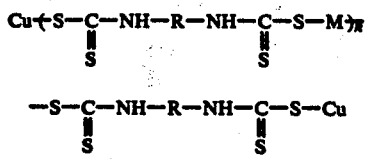

TABLE 1

| Preparation Example No. | R | M | n |
|---|---|---|---|
| 4 | 2,3-n-butylene | Cu | 20 |
| 5 | isobutylene | Pb | 10 |
| 6 | α-amylene | Mn | 90 |
| 7 | α-isoamylene | Fe | 40 |
| 8 | n-hexylene | Zn | 20 |
| 9 | 1,2-propylene | Mn and Fe in the ratio of 1:1 | 100 |
| 10 | ethylene | Co and Cu in the ratio of 5:1 | 60 |
| 11 | ethylene and 1,2-propylene in the ratio of 1:1 | Zn | 50 |
| 12 | 1,2-propylene and 1,2-n-butylene in the ratio of 3:1 | Ni | 80 |
| 13 | 1,2-propylene and isobutylene in the ratio of 10:1 | Co and Cu in the ratio of 1:2 | 100 |
| 14 | ethylene and 1,2-propylene in the ratio of 2:1 | Zn and Ni in the ratio of 5:1 | 20 |
| 15 | ethylene, 1,2-propylene and 1,2-n-butylene in the ratio of 3:1:1 | Zn, Ni and Co in the ratio of 2:1:1 | 150 |

TABLE 1-continued

| Preparation Example No. | R | M | n |
|---|---|---|---|
| 16 | Dicuprous ethylene bis-dithiocarbamate | | |
| 17 | Dicuprous 1,2-n-butylene bisdithiocarbamate | | |
| 18 | Dicuprous 1,2-n-butylene bisdithiocarbamate | | |
| 19 | Dicuprous isobutylene bisdithiocarbamate | | |

EXAMPLE 1

Raw materials having the below shown composition were charged into a receiver made of steel and roughly admixed by a dissolver to form a mixture, which was then dispersed by a sand grinder thereby obtaining an antifouling paint composition whose particle size was less than 30μ and whose consistency was 75 KU.

| Composition | Parts |
|---|---|
| The compound of Illustration No. 6 | 35 |
| Di-n-butylcyclohexyl tin chloride | 10 |
| Red oxide | 8 |
| Talc | 5 |
| Rosin | 18 |
| Vinyl chloride resin (Trademark: S-lec C made by Sekisui Chem. Ind. Co., Ltd.) | 6 |
| Levelling agent | 4 |
| Methyl isobutyl ketone | 4 |
| Xylene | 10 |
| | 100 |

EXAMPLE 2

Raw materials of the below-stated composition were dispersed as in Example 1, thereby obtaining an antifouling paint composition whose particle size was less than 20μ and whose consistency was 75 KU.

| Composition | Parts |
|---|---|
| Compound of Illustration No. 23 | 5 |
| Copolymer of bis (diethyl-n-butyl tin) maleate/methyl methacrylate/ethyl acrylate/styrene (weight ratio; 50/30/10/10, weight average molecular weight; 52,000) | 30 |
| Ethyl-n-butyl phenyl tin fluoride | 15 |
| Titanium dioxide | 20 |
| Cyanine blue | 8 |
| Antisagging agent | 3 |
| Xylene | 19 |
| | 100 |

EXAMPLE 3

Raw materials having the below-stated composition were dispersed as in Example 1, thereby obtaining an antifouling paint whose particle size was less than 35μ and whose consistency was 75 KU.

| Composition | Parts |
|---|---|
| Compound of Illustration No. 27 | 20 |
| Copolymer of bis(ethyl butyl n-propyltin) fumarate/methyl methacrylate/butyl acrylate (weight ratio; 50/35/15 weight average molecular weight; 20,000) | 25 |

-continued

| Composition | Parts |
|---|---|
| Bis(tributyl tin) oxide | 5 |
| Titanium dioxide | 20 |
| Brilliant carmin 6B | 5 |
| Levelling agent | 3 |
| Antisettling agent | 3 |
| Xylene | 10 |
| Solvent naphtha | 9 |
| | 100 |

EXAMPLE 4

Raw materials having the below-stated composition were dispersed as in Example 1, thereby obtaining an antifouling paint composition whose particle size was less than 30μ and whose consistency was 65 KU.

| Composition | Parts |
|---|---|
| Compound of Preparation Illustration No. 30 | 20 |
| Copolymer of ethyl tert-butylcyclohexyl tin acrylate/butyl methacrylate/styrene (weight ratio; 60/30/10 weight average molecular weight; 30,000) | 20 |
| Ethyl-n-butyl phenyl tin fluoride | 5 |
| Cyanine Blue | 15 |
| Titanium dioxide | 15 |
| Antisagging agent | 2 |
| Xylene | 23 |
| | 100 |

EXAMPLE 5

The raw materials having the below-stated composition were dispersed as in Example 1, thereby obtaining an antifouling paint composition whose particle size was less than 30μ and whose consistency was 75 KU.

| Composition | Parts |
|---|---|
| The compound prepared in preparation Example 9 | 20 |
| Triphenyl tin fluoride | 10 |
| Hansa yellow | 8 |
| Cyanine blue | 1 |
| Talc | 5 |
| Rosin | 20 |
| Chlorinated rubber resin (Trademark: Alloprene, R-20, made by ICI) | 10 |
| Chlorinated paraffin | 2.5 |
| Epoxy resin (Epicoat #834, made by Shell Chemical Co., Ltd.) | 0.2 |
| Antisegregating agent | 0.5 |
| Xylene | 11.4 |
| Solvent naphtha | 11.4 |
| | 100.0 |

EXAMPLE 6

Raw materials having the below-stated composition were dispersed as in Example 1, thereby obtaining an antifouling paint composition whose particle size was less than 25μ and whose consistency was 80 KU.

| Composition | Parts |
|---|---|
| The compound prepared in preparation Example 6 | 10 |
| The compound prepared in preparation Example 7 | 5 |
| The compound prepared in preparation Example 19 | 1 |

-continued

| Composition | Parts |
|---|---|
| Tributyl tin fluoride | 10 |
| Zinc dimethyldithiocarbamate | 5 |
| Indanthrene blue | 8 |
| Rosin | 20 |
| A copolymer resin of vinyl chloride and vinyl isobutyl ether (Trade mark: Laroflex 45 made by BASF) | 15 |
| Toluene | 13 |
| Xylene | 13 |
| | 100 |

EXAMPLE 7

Raw materials having the below-stated composition were dispersed as in Example 1, thereby obtaining an antifouling paint composition whose particle size was less than 50μ and whose consistency was 85 KU.

| Composition | Parts |
|---|---|
| The compound prepared in preparation Example 13 | 45 |
| Tributyl tin fluoride | 5 |
| Carbon black | 3 |
| Rosin | 15 |
| Vinyl chloride resin (S-lec C, made by Sekisui Chemical Co., Ltd.) | 7.5 |
| Levelling agent | 1 |
| Methyl isobutyl ketone | 10 |
| Xylene | 13.5 |
| | 100.0 |

EXAMPLE 8

Raw materials of the below-stated composition were dispersed as in Example 1, thereby obtaining an antifouling paint composition whose particle size was less than 40μ and whose consistency was 80 KU.

| Composition | Parts |
|---|---|
| The compound prepared in preparation Example 5 | 35 |
| Triphenyl tin chloride | 1 |
| Iron oxide | 8 |
| Rosin | 15 |
| Ester gum | 5 |
| Copolymer resin of styrene and butadiene (Denka Coat CL-150P, Trademark, made by Denki Kagaku Kogyo K.K.) | 10 |
| Xylene | 13 |
| Solvent naphtha | 13 |
| | 100 |

EXAMPLE 9

Raw materials of the below-stated composition were dispersed as in Example 1, thereby obtaining an antifouling paint composition whose particle size was less than 25μ and whose consistency was 70 KU.

| Composition | Parts |
|---|---|
| The compound prepared in preparation Example 4 | 10 |
| The compound prepared in preparation Example 15 | 10 |
| The compound prepared in preparation Example 18 | 3 |
| Triphenyl tin varsate | 10 |
| 2,4-Dichlorophenoxyacetic acid | 3 |

| Composition | Parts |
|---|---|
| Cyanine blue | 5 |
| Rosin | 20 |
| Acryl resin (methyl methacrylate/butyl acrylate/hydroxy methacrylate in a weight ratio of 60/38/2) which had a weight average molecular weight of 45,000 | 10 |
| Xylene | 25 |
| Mineral spirit | 4 |
| | 100 |

EXAMPLE 10

Raw materials having the below-stated composition were dispersed as in Example 1, thereby obtaining an antifouling paint composition whose particle size was less than 20μ and whose consistency was 65 KU.

| Composition | Parts |
|---|---|
| The compound prepared in preparation Example 11 | 20 |
| A copolymer of tributyl tin methacrylate and methyl methacrylate in a ratio of 60/40 by weight which has a weight average molecular weight of 60,000 | 30 |
| Titanium dioxide | 15 |
| Cyanine blue | 4 |
| Antisagging agent | 1 |
| Xylene | 30 |
| | 100 |

EXAMPLE 11

Raw materials having the below-stated composition were dispersed as in Example 1, thereby obtaining an antifouling paint composition whose particle size was less than 20μ and whose consistency ws 65 KU.

| Composition | Parts |
|---|---|
| The compound prepared in preparation Example 1 | 10 |
| A polymer of tributyl tin methacrylate, methylmethacrylate and butylacrylate in a ratio of 70/20/10 by weight which has a weight average molecular weight of 15,000 | 25 |
| Tributyl tin oxide | 3 |
| Zinc oxide | 30 |
| Iron oxide | 5 |
| Antisettling agent | 3 |
| Xylene | 20 |
| Solvent naphtha | 4 |
| | 100 |

EXAMPLE 12

Raw materials having the following composition were dispersed as in Example 1, thereby obtaining an antifouling paint composition whose particle size was less than 35μ and whose consistency was 80 KU.

| Composition | Parts |
|---|---|
| The compound prepared in preparation Example 12 | 15 |
| A copolymer of tributyl acrylate and styrene in a ratio of 55/45 by weight which has a weight average molecular weight of 40,000 | 35 |
| Titanium dioxide | 10 |
| Brilliant carmine 6B | 5 |
| Levelling agent | 1 |
| Toluene | 34 |
| | 100 |

EXAMPLE 13

The raw materials of the below-stated compositions were dispersed as in Example 1, thereby obtaining an antifouling paint composition whose particle size was less than 50μ and when consistency was 75 KU.

| Composition | Parts |
|---|---|
| The compound prepared in preparation Example 14 | 15 |
| The compound prepared in preparation Example 16 | 5 |
| Zinc ethylene bisdithiocarbamate | 2 |
| Copolymer of tributyl tin methacrylate/ methyl methacrylate/2-ethylhexyl acrylate in a ratio of 60/10/20 by weight (weight average molecular weight; 50,000) | 30 |
| Titanium dioxide | 10 |
| Cyanine green | 3 |
| Antisagging agent | 1 |
| Xylene | 20 |
| Solvent naphtha | 14 |
| | 100 |

EXAMPLE 14

The raw materials of the below-stated composition were dispersed as in Example 1, thereby obtaining an antifouling paint composition whose particle size was less than 60μ and whose consistency was 70 KU.

| Composition | Parts |
|---|---|
| The product prepared in preparation Example 2 | 20 |
| Copolymer of bis-tributyl tin fumarate/ ethyl acrylate in a ratio of 80/20 by weight (weight average molecular weight; 20,000) | 30 |
| Bis-triphenyl tin $\alpha,\alpha'$ dibromosuccinate | 5 |
| Titanium dioxide | 10 |
| Cyanine green | 3 |
| Xylene | 32 |
| | 100 |

EXAMPLE 15

The raw materials of the below-stated composition were dispersed as in Example 1, thereby obtaining an antifouling paint composition whose particle size was less than 40μ and whose consistency was 75 KU.

| Composition | Parts |
|---|---|
| The product prepared in preparation Example 3 | 18 |
| Copolymer of bis-tricyclohexyl tin maleate/vinyl acetate in a ratio of 75/25 by weight which has weight average molecular weight; 15,000 | 40 |
| Triphenyl tin hydroxide | 10 |
| Benzidine orange | 3 |
| Xylene | 24 |
| Isopropyl alcohol | 5 |
| | 100 |

EXAMPLE 16

The raw materials of the below-stated composition were charged in a receiver and were dissolved and dispersed by a high speed dissolver, thereby obtaining an antifouling composition for fishery nets whose viscosity was 20 minutes in Ford cup #4.

| Composition | Parts |
|---|---|
| The product prepared in preparation Example 10 | 0.5 |
| Copolymer of triphenyl tin methacrylate/methyl methacrylate/2-ethylhexyl acrylate in a ratio of 70/10/20 by weight which has weight average molecular weight; 100,000 | 40 |
| Crystal violet | 2 |
| Ultraviolet absorption agent | 0.2 |
| Xylene | 52.3 |
| Butanol | 5 |
| | 100 |

EXAMPLE 17

The raw materials of the below-stated composition were dispersed as in Example 1, thereby obtaining an antifouling paint composition whose particle size was less than 60μ and whose consistency was 70 KU.

| Composition | Parts |
|---|---|
| The product prepared in preparation Example 8 | 5 |
| The product prepared in preparation Example 12 | 10 |
| The product prepared in preparation Example 17 | 3 |
| Copolymer of triphenyl tin methacrylate/ethyl acrylate/vinyl butyrate in a weight ratio of 60/25/15 which had weight average molecular weight of 30,000 | 30 |
| 2-methylthio-4-isopropylamino-6-ethylamino-S—triazine | 5 |
| Iron oxide | 10 |
| Xylene | 20 |
| Solvent naphtha | 17 |
| | 100 |

COMPARATIVE EXAMPLE 1

The raw materials of the below-stated composition were dispersed as in Example 1, thereby obtaining an antifouling paint composition whose particle size was less than 40μ and whose consistency was 75 KU.

| Composition | Parts |
|---|---|
| Product prepared in preparation Example 1 | 40 |
| Titanium dioxide | 8 |
| Cyanine blue | 2 |
| Rosin | 12 |
| Vinyl chloride resin (Trademark: S-lex C made by Sekisui Chemicals Co., Ltd.) | 12 |
| Epoxy resin (Trademark: Epicoat #834 made by Shell Chemicals) | 1 |
| Methyl isobutyl Ketone | 12 |
| Xylene | 13 |
| | 100 |

COMPARATIVE EXAMPLE 2

The raw materials of the below-stated composition were dispersed as in Example 1, thereby obtaining an antifouling paint composition whose particle size was less than 35μ and whose consistency was 70 KU.

| Composition | Parts |
|---|---|
| Tributyl tin fluoride | 40 |
| Iron oxide | 8 |
| Rosin | 12 |
| Vinyl chloride resin (S-lex C: Sekisui Chemicals Co., Ltd.) | 12 |
| Epoxy resin (Epicoat #834 of Shell Chemicals Co.,) | 1 |
| Leveling agent | 0.5 |
| Methyl isobutyl ketone | 12 |
| Xylene | 14.5 |
| | 100.0 |

COMPARATIVE EXAMPLE 3

The raw materials of the below-stated composition were dispersed as in Example 1, thus thereby obtaining an antifouling paint composition whose particle size was less than 35μ and whose consistency was 70 KU.

| Composition | Parts |
|---|---|
| Copolymer of tributyl tin methacrylate/methyl methacrylate/butyl acrylate (the product used in Example 7) | 45 |
| Titanium dioxide | 10 |
| Zinc oxide | 5 |
| Antisettling agent | 1 |
| Toluene | 20 |
| Solvent naphtha | 19 |
| | 100 |

COMPARATIVE EXAMPLE 4

The raw materials of the below-stated composition were dispersed as in Example 1, thus thereby obtaining an antifouling paint composition whose particle size was less than 45μ and whose consistency was 75 KU.

| Composition | Parts |
|---|---|
| Zinc 1,2-propylene bisdithiocarbamate | 30 |
| Iron oxide | 10 |
| Rosin | 20 |
| Chlorinated rubber (Trademark: Alloprene-R20 Made by ICI) | 10 |
| Paraffin chloride | 5 |
| Epoxy resin (Epicoat #1001: Shell Chemicals Co., ) | 1 |
| Xylene | 24 |
| | 100 |

COMPARATIVE EXAMPLE 5

The raw materials of the below-stated composition were dispersed as in Example 1, thus obtaining an antifouling paint composition whose particle size was less than 50μ and whose consistency was 75 KU.

| Composition | Parts |
|---|---|
| Zinc ethylene 1,2-propylene bis-dithiocarbamate (Ethylene:1,2-propylene = 1:1) | 35 |
| Titanium dioxide | 10 |
| Cyanine green | 3 |
| Rosin | 12 |
| Copolymer of styrene/butadiene (Denka Coat CL-150p, Denki Kagaku Kogyo K.K.) | 10 |

| Composition | Parts |
|---|---|
| Xylene | 30 |
| | 100 |

COMPARATIVE EXAMPLE 6

The raw materials of the below-stated composition were dispersed as in Example 6, thus obtaining an antifouling paint composition for fishery nets whose viscosity was 20 seconds in Ford cup #4.

| Composition | Parts |
|---|---|
| Copolymer of tributyl tin methacrylate/methyl methacrylate/2-ethylhexyl acrylate (Copolymer used in Example 9) | 40 |
| Triphenyl tin chloride | 5 |
| Cyanine blue | 3 |
| Xylene | 52 |
| | 100 |

COMPARATIVE EXAMPLE 7

The raw material of the below-stated composition were dispersed as in Example 1, thus obtaining an antifouling paint composition whose particle size was less than 50μ and whose consistency was 75 KU.

| Composition | Parts |
|---|---|
| Cuprous oxide | 40 |
| Iron oxide | 8 |
| Calcium carbonate | 5 |
| Rosin | 15 |
| Chlorinated rubber | 5 |
| Paraffin chloride | 2 |
| Antisettling agent | 1 |
| Xylene | 12 |
| Solvent naphtha | 12 |
| | 100 |

COATING TESTS

Antifouling paint compositions of the above-stated Examples 1~15, Example 17, comparative Examples 1~5 and Comparative Examples 7 were respectively coated with air spray two times in order to obtain the dried antifouling paint film of 100~120μ in total thickness on both sides of a test plate which was made of a mild steel and which was coated with vinyl anticorrosive paint four times.

These test plates were submerged in seawater from a raft for 24 months, thereby measuring the fouled area rate of marine organisms and that of marine microorganisms.

The obtained results ae shown in Table 2.

In Table 2, the valuation values for the marine organisms show the area of the test plate, on which marine animals such as Barnacle, Hydroids, Membranipora, Bugula, Mytilus, Sponges. and the like: and marine plants such as Enteromorpha, Ulva, Bangia, Tangles and the like coated, based on the total surface area of both sides of the test plate which is regarded as 100.

The evaluation values for marine microorganism show the area of the test plate on which marine microorganism coated, based on the surface areas of the both sides of the test plates as above stated. *Mark means that the coated area of marine animals and plants on the test plate was too large to estimate the evaluation value for marine microorganisma.

Table 3 shows the results of the examination about kinds of marine microorganisms which coated on the surfaces of the test plate after 12 months.

In Table 3, the evaluation values for marine bacteriums and marine fungi show the decision for species judging from the state of colonies which were obtained by culturing a certain quantity of sample which was taken from the surfaces of the test plate and the breeding degree thereof in five ranks.

In the evaluation value for Marine Diatoms, the species thereof was determined by examining with a microscope of 600 magnifications and the breeding degree thereof was evaluated in five ranks by calculating number of individuals in the field of vision of the microscope.

The evaluation values were applied as follows 5:
5: No breeding and No individuals were detected.
4: A little breeding was appreciated and the number of detected individuals was less than 100/cm$^2$.
3: A medium breeding was appreciated and the number of detected individuals was 100~1000/cm$^2$.
2: Considerable breeding was appreciated and the number of individuals was 1,000~100,000/cm$^2$.
1: Extremely remarkable breeding was appreciated and the number of individuals was over 100,000/cm$^2$.

Into the antifouling composition for fishery nets of Example 16 and Comparative Example 6, fishery net of 30 cm × 100 cm which was made of 32-ply polyethylene thread having 7 joints without knot were respectively immersed for 3 minutes, pulled out and dried.

The processed fishery nets were respectively submerged into seawater to investigate about the fouling of marine plants and plants, and also the fouling of marine organisms. The obtained results are shown in Table 4.

The evaluation values in Table 4, show the area of the test fishery nets on the surface of which the marine animals and plants, or the marine organisms fouled, based on the total surface area of the test fishery nets which are regarded as 100.

Further, the above-stated coating test was carried out out from February 1978 to January 1981.

TABLE 2

| Antifouling paint composition | Distinction of Adhered Organism | | | | | |
|---|---|---|---|---|---|---|
| | Marine animal and plant | | | Marine microorganism | | |
| | 6 months | 12 months | 24 months | 6 months | 12 months | 24 months |
| Example 1 | 0 | 1 | 15 | 0 | 0 | 10 |
| Example 2 | 0 | 0 | 10 | 0 | 0 | 5 |
| Example 3 | 0 | 0 | 10 | 0 | 0 | 5 |
| Example 4 | 0 | 0 | 5 | 0 | 0 | 5 |
| Example 5 | 0 | 0 | 10 | 0 | 0 | 10 |
| Example 6 | 0 | 0 | 15 | 0 | 5 | 15 |
| Example 7 | 0 | 5 | 30 | 0 | 0 | 5 |
| Example 8 | 0 | 5 | 40 | 0 | 5 | 20 |
| Example 9 | 0 | 0 | 0 | 0 | 0 | 0 |
| Example 10 | 0 | 0 | 0 | 0 | 0 | 0 |
| Example 11 | 0 | 0 | 0 | 0 | 0 | 5 |
| Example 12 | 0 | 0 | 0 | 0 | 0 | 10 |
| Example 13 | 0 | 0 | 0 | 0 | 0 | 0 |
| Example 14 | 0 | 0 | 0 | 0 | 0 | 5 |
| Example 15 | 0 | 0 | 0 | 0 | 0 | 5 |
| Example 17 | 0 | 0 | 0 | 0 | 0 | 0 |
| Comparative Example 1 | 0 | 30 | 100 | 10 | 40 | * |
| Comparative Example 2 | 0 | 5 | 90 | 80 | 100 | * |

TABLE 2-continued

| Anti-fouling paint composition | Distinction of Adhered Organism | | | | | |
|---|---|---|---|---|---|---|
| | Marine animal and plant | | | Marine microorganism | | |
| | 6 months | 12 months | 24 months | 6 months | 12 months | 24 months |
| Comparative Example 3 | 0 | 0 | 0 | 70 | 90 | 100 |
| Comparative Example 4 | 0 | 50 | 100 | 30 | 50 | * |
| Comparative Example 5 | 0 | 35 | 100 | 25 | 50 | * |
| Comparative Example 7 | 0 | 5 | 60 | 50 | 90 | * |

TABLE 3

| Anti-fouling paint Composition | Adhered Organisms | | | | | | | | | | |
|---|---|---|---|---|---|---|---|---|---|---|---|
| | Marine Bacteria | | | Marine Fungi | | Marine Diatom | | | | | |
| | Pseudomonas SP. | Bacillius subtilis | Caulobacter SP. | Aspergillus SP. | Nigrospora SP. | Navicula SP. | Nitzschia SP. | Licmophora SP. | Melosira SP. | Biddulphia SP. | Total |
| Example 1 | 4 | 5 | 5 | 5 | 4 | 4 | 4 | 5 | 5 | 5 | 46 |
| Example 2 | 4 | 4 | 5 | 5 | 5 | 4 | 5 | 5 | 5 | 5 | 47 |
| Example 3 | 4 | 5 | 4 | 5 | 5 | 5 | 5 | 5 | 5 | 5 | 48 |
| Example 4 | 4 | 5 | 5 | 5 | 5 | 4 | 5 | 5 | 5 | 5 | 48 |
| Example 5 | 5 | 5 | 5 | 5 | 5 | 5 | 5 | 5 | 5 | 5 | 50 |
| Example 6 | 3 | 4 | 4 | 5 | 5 | 4 | 5 | 5 | 5 | 5 | 45 |
| Example 7 | 5 | 5 | 5 | 5 | 5 | 5 | 5 | 5 | 5 | 5 | 50 |
| Example 8 | 3 | 4 | 3 | 5 | 5 | 4 | 5 | 4 | 5 | 5 | 43 |
| Example 9 | 5 | 5 | 5 | 5 | 5 | 5 | 5 | 5 | 5 | 5 | 50 |
| Example 10 | 5 | 5 | 5 | 5 | 5 | 5 | 5 | 5 | 5 | 5 | 50 |
| Example 11 | 5 | 5 | 5 | 5 | 5 | 5 | 5 | 5 | 5 | 5 | 50 |
| Example 12 | 5 | 5 | 5 | 5 | 5 | 5 | 5 | 5 | 5 | 5 | 50 |
| Example 13 | 5 | 5 | 5 | 5 | 5 | 5 | 5 | 5 | 5 | 5 | 50 |
| Example 14 | 5 | 5 | 5 | 5 | 5 | 5 | 5 | 5 | 5 | 5 | 50 |
| Example 15 | 5 | 5 | 5 | 5 | 5 | 5 | 5 | 5 | 5 | 5 | 50 |
| Example 17 | 5 | 5 | 5 | 5 | 5 | 5 | 5 | 5 | 5 | 5 | 50 |
| Comparative Example 1 | 1 | 2 | 1 | 3 | 3 | 3 | 3 | 4 | 3 | 4 | 27 |
| Comparative Example 2 | 1 | 1 | 1 | 2 | 1 | 1 | 1 | 2 | 3 | 3 | 16 |
| Comparative Example 3 | 1 | 1 | 2 | 2 | 3 | 1 | 1 | 3 | 4 | 4 | 22 |
| Comparative Example 4 | 1 | 1 | 2 | 3 | 2 | 3 | 3 | 3 | 4 | 3 | 25 |
| Comparative Example 5 | 1 | 1 | 1 | 2 | 3 | 3 | 3 | 4 | 4 | 3 | 25 |
| Comparative Example 7 | 1 | 2 | 2 | 1 | 2 | 1 | 1 | 4 | 3 | 4 | 21 |

TABLE 4

| Anti-fouling composition for fishing net | Adhered Organism | | | | | |
|---|---|---|---|---|---|---|
| | Marine animals and plants | | | Marine microorganisms | | |
| | 3 months | 6 months | 12 months | 3 months | 6 months | 12 months |
| Example 16 | 0 | 0 | 0 | 0 | 0 | 0 |
| Comparative Example 6 | 0 | 0 | 0 | 30 | 50 | 100 |

Table 5 shows the SP. of the marine microorganisms which adhered to the test fishery nets for 6 months and the fouling quantity thereof.

The evaluation values in Table 5 are identical to those as described in Example 1~15 and Example 17.

TABLE 5

| | Adhered organism | | | | | | | | | | |
|---|---|---|---|---|---|---|---|---|---|---|---|
| | Marine bacteria | | | | | Marine diatom | | | | | |
| | Achromobacter SP. | Micrococcus SP. | Sarcina SP. | Flavobacterium SP. | Asprospira SP. | Achnanthes SP. | Asteromphalus SP. | Diatoma SP. | Phabdonema SP. | Syndera SP. | total |
| Example 16 | 5 | 5 | 5 | 5 | 5 | 5 | 5 | 5 | 5 | 5 | 50 |
| Comparative Example 6 | 2 | 1 | 2 | 3 | 3 | 2 | 1 | 2 | 2 | 1 | 19 |

It is apparent from the foregoing explanation, that the antifouling compositions of the present invention are superior to the conventional antifouling paint compositions or antifouling compositions for fishery nets in the antifouling properties.

It is recognized that the antifouling compositions of the present invention exhibit splendid antifouling properties for long time.

EXAMPLE 18

The raw materials of the below-stated composition were dispersed as in Example 1, thereby obtaining an antifouling paint composition whose particle size was less than 30μ and whose consistency was 75 KU.

| Composition | Parts |
|---|---|
| Compound of Illustration Example 1 | 20 |
| Copolymer of tributyl tin methacrylate/ methyl methacrylate in a ratio of 60/40 by weight which has weight average molecular weight of 60,000 | 30 |
| Titanium dioxide | 15 |
| Cyanine blue | 4 |
| Antisagging agent | 1 |
| Xylene | 30 |
| | 100 |

EXAMPLE 19

The raw meterials of the below-stated composition were dispersed as in Example 1, thereby obtaining an antifouling paint composition whose particle size was less than 20μ and whose consistency was 70 KU.

| Composition | Parts |
|---|---|
| Compound of Illustration Example 7 | 10 |
| Copolymer of tributyl tin methacrylate/ methyl methacrylate/butyl acrylate in a rate of 70/20/10 by weight which has weight average molecular weight of 15,000 | 25 |
| Tributyl tin oxide | 3 |
| Zinc oxide | 30 |
| Iron oxide | 5 |
| Antisettling agent | 3 |
| Xylene | 20 |
| Solvent naphtha | 4 |
| | 100 |

EXAMPLE 20

The raw materials of the below-stated composition were dispersed as in Example 1, thereby obtaining an antifouling paint composition whose particle size less than 35μ and whose consistency was 80 KU.

| Composition | Parts |
|---|---|
| Compound of Illustration Example 8 | 15 |
| Copolymer of tributyl tin acrylate/ styrene in a ratio of 55/45 by weight which has a weight average molecular weight of 40,000 | 35 |
| Cuprous thiocyanate | 10 |
| Brilliant carmine 6B | 5 |
| Levelling agent | 1 |
| Toluene | 34 |
| | 100 |

EXAMPLE 21

The raw materials of the below-stated composition were dispersed as in Example 1, thereby obtaining an antifouling paint composition whose particles size was less than 5μ and whose consistency was 85 KU.

| Composition | Parts |
|---|---|
| Compound of Illustration Example 10 | 25 |
| Compound of Illustration Example 12 | 25 |
| Copolymer of tributyl tin methacrylate/ methyl methacrylate/2-ethylhexyl acrylate in a ratio of 60/10/20 by weight which has weight average molecular weight of 50,000 | 20 |
| Titanium oxide | 5 |
| Cyanine green | 2 |
| Antisagging agent | 1 |
| Xylene | 11 |
| Solvent naphtha | 11 |
| | 100 |

EXAMPLE 22

The raw materials of the below-stated composition were dispersed as in Example 1, thereby obtaining an antifouling paint composition whose particle size was less than 60μ and whose consistency was 70 KU.

| Composition | Parts |
|---|---|
| Compound of Illustration Example 14 | 20 |
| Copolymer of bistributyl tin fumarate/ ethyl acrylate in a ratio of 80/20 by weight which has weight average molecular weight of 20,000 | 30 |
| Bistriphenyl tinα,α' dibromosuccinate | 5 |
| Titanium dioxide | 10 |
| Cyanine green | 3 |
| Xylene | 32 |
| | 100 |

EXAMPLE 23

The raw materials of the below-stated composition were dispersed as in Example 1, thereby obtaining whose particle size was less than 40μ and whose consistency was 75 KU.

| Composition | Parts |
|---|---|
| Compound of Illustration Example 17 | 18 |
| Copolymer of bis (tricyclohexyl tin) maleate/ vinyl acetate in a ratio of 75/25 by weight which has weight average molecular weight of 15,000 | 40 |
| Triphenyl tin hydroxide | 10 |
| Xylene | 24 |
| Benzidine orange | 3 |
| Isopropyl alcohol | 5 |
| | 100 |

EXAMPLE 24

The raw materials having the below-stated composition were dispersed as in Example 16, thereby obtaining an antifouling composition for fishery nets whose viscosity was 20 seconds in Ford cup #4.

| Composition | Parts |
|---|---|
| Compounds of Illustration Example 25 | 0.5 |
| Copolymer of triphenyl tin methacrylate/ methyl methacrylate/2-ethylhexyl acrylate in a ratio of 70/10/20 which has weight average molecular weight of 100,000 | 58 |
| Crystal violet | 2 |
| Ultraviolet absorption agent | 0.2 |
| Xylene | 34.3 |
| Butyl alcohol | 5 |

EXAMPLE 25

The raw materials of the below-stated composition were dispersed as in Example 1, thereby obtaining an antifouling paint composition whose particle size was less than 60μ and whose consistency was 70 KU.

| Composition | Parts |
|---|---|
| Compound of Illustration Example 22 | 10 |
| Compound of Illustration Example 26 | 5 |
| Compound of Illustration Example 29 | 3 |
| Copolymer of triphenyl tin methacrylate/ethyl acrylate/vinyl butylate in a ratio of 60/25/15 which has weight average molecular weight of 30,000 | 30 |
| 2-methylthio-4-isopropylamino-6-ethylamino-S—triazine | 5 |
| Iron oxide | 10 |
| Xylene | 20 |
| Solvent naphtha | 17 |
| | 100 |

COMPARATIVE EXAMPLE 8

The raw materials of the below-stated composition were dispersed as in Example 1, thus thereby obtaining an antifouling paint composition whose particle size was less than 40μ and whose consistency was 75 KU.

| Composition | Parts |
|---|---|
| Compound of Illustration No. 1 | 40 |
| Titanium dioxide | 8 |
| Cyanine blue | 2 |
| Rosin | 12 |
| Vinyl chloride resin (Trademark: S-lex C made by Sekisui Chemicals Co., Ltd.) | 12 |
| Epoxy resin (Trademark: Epicoat #834) | 1 |
| Methylisobutyl ketone | 12 |
| Xylene | 13 |
| | 100 |

COMPARATIVE EXAMPLE 9

The raw materials of the below-stated composition were dispersed as in Example 1, thus thereby obtaining an antifouling paint composition whose particle size was less than 45μ and whose consistency was 75 KU.

| Composition | Parts |
|---|---|
| Compound of Illustration No. 9 | 30 |
| Iron oxide | 10 |
| Rosin | 20 |
| Rubber chloride (Trademark: Alloprene-R20 made by ICI) | 10 |
| Paraffin chloride | 5 |
| Epoxy resin (Trademark: Epicoat #1001, made by Shell Co.,) | 1 |
| Xylene | 24 |
| | 100 |

COMPARATIVE EXAMPLE 10

The raw materials of the below-stated composition were dispersed as in Example 1, thus thereby obtaining an antifouling paint composition whose particle size was less than 50μ and whose consistency was 75 KU.

| Composition | Parts |
|---|---|
| Compound of Illustration No. 14 | 35 |
| Titanium dioxide | 10 |
| Cyanine blue | 3 |
| Rosin | 12 |
| Copolymer of ethylene/butadiene (Trademark: Denka Coat CL-150P) made by Denki Kagaku Kogyo K. K.) | 10 |
| Xylene | 30 |
| | 100 |

COMPARATIVE EXAMPLE 11

The raw materials of the below-stated composition were dispersed as in Example 1, thus thereby obtaining an antifouling paint composition whose particle size was less than 35μ and whose consistency was 70 KU.

| Composition | Parts |
|---|---|
| Copolymer of tributyl tin methacrylate/methyl methacrylate/butyl acrylate (the same as that used in Example 19) | 45 |
| Titanium dioxide | 10 |
| Zinc oxide | 5 |
| Antisettling agent | 1 |
| Toluene | 20 |
| Solvent naphtha | 19 |
| | 100 |

COMPARATIVE EXAMPLE 12

The raw materials of the below-stated composition were dispersed as in Example 1, thus thereby obtaining an antifouling paint composition whose particle size was less than 50μ and whose consistency was 75 KU.

| Composition | Parts |
|---|---|
| Cuprous oxide | 40 |
| Iron oxide | 8 |
| Calcium carbonate | 5 |
| Rosin | 15 |
| Chlorinated rubber | 5 |
| Paraffin chloride | 2 |
| Antisettling agent | 1 |
| Zylene | 12 |
| Solvent naphtha | 12 |
| | 100 |

COMPARATIVE EXAMPLE 13

The raw materials of the below-stated composition were dispersed as in Example 6, thus obtaining an antifouling paint composition for fishery net whose viscocity was 20 seconds in Ford cup #4.

| Composition | Parts |
|---|---|
| Copolymer of tributyl tin methacrylate/methyl methacrylate/2-ethylhexyl acrylate (the same copolymer as used in Example 21) | 40 |
| Triphenyl tin chloride | 5 |
| Cyanine blue | 3 |
| Xylene | 52 |
| | 100 |

COATING TEST

According to the same procedures as those described in Example 1~15, and so on, antifouling paint compositions of Examples 18~23, Example 25, and Comparative Examples 8~12 were respectively coated on the same test plate as employed in Example 1~15, and each test plate was submerged in seawater to investigate the fouling area rate of marine animals and plants and the fouling area rate of marine microorganism for 24 months, when the test period was from February 1978 to January, 1980. The obtained results are shown in Tables 6 and 7.

In Table 6, the evaluation values for marine animals and plants are identical to those as represented in Table 1.

Table 7 shows the results of investigating about the kinds of marine microorganisms adhered to the both sides of the test plates. The evaluation values for marine bacterias and marine Fungi are identical to those that as represented in Table 2.

The antifouling compositions of Example 24 and Comparative Example 13, were examined about the adhesive properties of marine animals and plants, and those of marine microorganisms for 12 months, according to the same procedures as those described in Example 16 and Comparative Example 6.

The obtained results are shown in Table 8, wherein the valuation values for breedings of marine bacterias and marine diatoms are the same as in relation with Table 4.

Table 9 shows the kinds and the quantities of the microorganisms which adhered to the test fishery nets after 6 months from the submersion. The evaluation values in Table 9 are the same as those described in relation with Table 5.

It is apparent from the above-stated description that the antifouling compositions of the present invention are superior to the conventional antifouling paint compositions and antifouling compositions for fishery nets in the antifouling property for marine microorganisms and that they can keep the splendid antifouling property as antifouling composition for a long time.

TABLE 6

| | Marine animals and plants Testing duration | | | Marine microorganism Testing duration | | |
|---|---|---|---|---|---|---|
| | 6 months | 12 months | 24 months | 6 months | 12 months | 24 months |
| Example 18 | 0 | 0 | 0 | 0 | 0 | 0 |
| Example 19 | 0 | 0 | 0 | 0 | 0 | 5 |
| Example 20 | 0 | 0 | 0 | 0 | 0 | 10 |
| Example 21 | 0 | 0 | 0 | 0 | 0 | 0 |
| Example 22 | 0 | 0 | 0 | 0 | 0 | 5 |
| Example 23 | 0 | 0 | 0 | 0 | 0 | 0 |
| Example 25 | 0 | 0 | 0 | 0 | 0 | 5 |
| Comparative Example 8 | 0 | 30 | 100 | 10 | 40 | * |
| Comparative Example 9 | 5 | 50 | 100 | 30 | 50 | * |
| Comparative Example 10 | 0 | 35 | 100 | 25 | 50 | * |
| Comparative Example 11 | 0 | 0 | 0 | 70 | 90 | 100 |
| Comparative Example 12 | 0 | 5 | 60 | 50 | 90 | * |

TABLE 7

| | Marine Bacteria | | | Marine Fungi | | Marine Diatom | | | | | |
|---|---|---|---|---|---|---|---|---|---|---|---|
| | Pseudomonas SP. | Bacillius subtilis | Caulobacter SP. | Aspergillus SP. | Nigrospora SP. | Navicula SP. | Nitzschia SP. | Licmophora SP. | Melosira SP. | Biddulphia SP. | Sum |
| Example 18 | 5 | 5 | 5 | 5 | 5 | 5 | 5 | 5 | 5 | 5 | 50 |
| Example 19 | 3 | 4 | 4 | 5 | 5 | 4 | 5 | 5 | 5 | 5 | 45 |
| Example 20 | 2 | 3 | 3 | 5 | 4 | 5 | 5 | 5 | 4 | 4 | 40 |
| Example 21 | 5 | 5 | 5 | 5 | 5 | 5 | 5 | 5 | 5 | 5 | 50 |
| Example 22 | 3 | 4 | 3 | 5 | 5 | 4 | 5 | 4 | 5 | 5 | 43 |
| Example 23 | 5 | 5 | 5 | 5 | 5 | 5 | 5 | 5 | 5 | 5 | 50 |
| Example 25 | 3 | 4 | 3 | 5 | 5 | 5 | 4 | 5 | 5 | 5 | 44 |
| Comparative Example 8 | 1 | 2 | 1 | 3 | 3 | 3 | 3 | 4 | 3 | 4 | 27 |
| Comparative Example 9 | 1 | 1 | 1 | 2 | 3 | 3 | 3 | 4 | 4 | 3 | 25 |
| Comparative Example 10 | 1 | 1 | 2 | 3 | 2 | 3 | 3 | 3 | 4 | 3 | 25 |
| Comparative Example 11 | 1 | 1 | 1 | 2 | 1 | 1 | 1 | 2 | 3 | 3 | 16 |
| Comparative Example 12 | 1 | 1 | 1 | 2 | 2 | 1 | 1 | 3 | 2 | 3 | 17 |

TABLE 8

| | Marine animals and plants | | | Marine microorganism | | |
|---|---|---|---|---|---|---|
| | 3 months | 6 months | 12 months | 3 months | 6 months | 12 months |
| Example 24 | 0 | 0 | 0 | 0 | 5 | 20 |
| Comparative Example 13 | 0 | 0 | 0 | 30 | 50 | 100 |

TABLE 9

| | Adhered organism | | | | | | | | | | |
|---|---|---|---|---|---|---|---|---|---|---|---|
| | Marine bacteria | | | | | Marine diatom | | | | | |
| | Achromobacter SP. | Micrococcus SP. | Sarcina SP. | Flavobacterium SP. | Asprospira SP. | Achnanthes SP. | Asterromphales SP. | Diatoma SP. | Phabdonema SP. | Synedra SP. | Total |
| Example 24 | 5 | 4 | 4 | 5 | 4 | 5 | 5 | 4 | 4 | 5 | 45 |
| Comparative | 2 | 3 | 2 | 4 | 3 | 2 | 2 | 2 | 2 | 2 | 24 |

TABLE 9-continued

| | Adhered organism | | | | | | | | | |
|---|---|---|---|---|---|---|---|---|---|---|
| | Marine bacteria | | | | | Marine diatom | | | | |
| | Achromo-bacter SP. | Micro-coccus SP. | Sarcina SP. | Flavobac-terium SP. | Asprospira SP. | Achnanthes SP. | Asterom-phales SP. | Diatoma SP. | Phabdonema SP. | Synedra SP. | Total |

Example 13

EXAMPLE 26

The raw materials of the below-stated compositions were dispersed as in Example 1, thereby obtaining an antifouling paint composition whose particle size was less than 30μ and whose consistency was 75 KU.

| Composition | Parts |
|---|---|
| Dithiocarbamic acid derivatives of Illustration No. 1 | 20 |
| Copolymer of tributyl tin methacrylate/methyl methacrylate (60/40) (M.W: 40,000) | 30 |
| Cuprous thiocyanate | 10 |
| Titanium oxide | 8 |
| Levelling agent | 4 |
| Antisagging agent | 1 |
| Toluene | 27 |
| | 100 |

EXAMPLE 27

The raw materials of the below-stated compositions were dispersed as in Example 1, thereby obtaining an antifouling paint composition whose particle size was less than 25μ and whose consistency was 70 KU.

| Composition | Parts |
|---|---|
| Dithiocarbamic acid derivatives of Illustration No. 7 | 10 |
| Copolymer of tributyl tin methacrylate/methyl methacrylate/butyl acrylate (70/20/10) (M.W: 15,000) | 25 |
| Tributyl tin oxide | 3 |
| Cuprous oxide | 10 |
| Iron oxide | 5 |
| Zinc oxide | 25 |
| Antisettling agent | 3 |
| Xylene | 15 |
| Solvent naphtha | 4 |
| | 100 |

EXAMPLE 28

The raw materials of the below-stated compositions were dispersed as in Example 1, thereby obtaining an antifouling paint composition whose particle size was less than 35μ and whose consistency was 80 KU.

| Composition | Parts |
|---|---|
| Dithiocarbamic acid derivative of Illustration No. 10 | 15 |
| Copolymer of tributyl tin acrylate/styrene (55/45) (M.W.: 40,000) | 35 |
| Cuprous thiocyanate | 10 |
| Brilliant carmine 6B | 5 |
| Levelling agent | 1 |
| Toluene | 34 |
| | 100 |

EXAMPLE 29

The raw materials of the below-stated compositions were dispersed as in Example 1, thereby obtaining an antifouling paint composition whose particle size was less than 50μ and whose consistency was 85 KU.

| Composition | Parts |
|---|---|
| Dithiocarbamic acid derivative of Illustration No. 10 | 25 |
| Dithiocarbamic acid derivative of Illustration No. 12 | 25 |
| Copolymer of tributyl tin methacrylate/methyl methacrylate/2-ethylhexyl acrylate (60/20/20) (M.W.: 50,000) | 20 |
| Cupric citrate | 1 |
| Titanium dioxide | 4 |
| Cyanine blue | 2 |
| Antisagging agent | 1 |
| Xylene | 11 |
| Solvent naphtha | 11 |
| | 100 |

EXAMPLE 30

The raw materials of the below-stated compositions were dispersed as in Example 1, thereby obtaining paint composition whose particle size was less than 60μ and whose consistency was 70 KU.

| Composition | Parts |
|---|---|
| Dithiocarbamic acid derivative of Illustration No. 14 | 20 |
| Copolymer of bis (trybutyl tin) fumarate/ethyl acrylate (80/20) (M.W 20,000) | 25 |
| Bistriphenyl tin α,α-dibromosuccinate | 5 |
| Cupric chromate | 5 |
| Titanium dioxide | 10 |
| Cyanine green | 3 |
| Xylene | 32 |
| | 100 |

EXAMPLE 31

The raw materials of the below-stated compositions were dispersed as in Example 1, thereby obtaining paint composition whose particle size was less than 40μ and whose consistency was 75 KU.

| Composition | Parts |
|---|---|
| Dithiocarbamic acid derivative of Illustration No. 17 (60/35/5) (M.W 60,000) | 18 |
| Copolymer of tributyl tin methacrylate/methyl methacrylate/2-ethylhexyl acrylate | 20 |
| Cuprous oxide | 40 |
| Ferrous oxide | 5 |
| Xylene | 10 |
| Isopropyl alcohol | 7 |

| Composition | Parts |
|---|---|
| | 100 |

EXAMPLE 32

The raw materials having the below-stated composition were dispersed as in Example 16, thereby obtaining an antifouling composition for fishing-nets whose viscosity was 20 seconds in Ford cup #4.

| Composition | Parts |
|---|---|
| Dithiocarbamic acid derivative of Illustration No. 25 | 1 |
| Copolymer of triphenyl tin methacrylate/methyl methacrylate/2-ethylhexyl acrylate (70/10/20) (M.W.: 100,000) | 48 |
| Cupric tartrate | 10 |
| Crystal violet | 2 |
| Ultraviolet absorption agent | 0.2 |
| Xylene | 33.8 |
| Butyl alcohol | 5 |
| | 100 |

EXAMPLE 33

The raw materials of the below-stated compositions were dispersed as in Example 1, thereby obtaining an antifouling paint composition whose particle size was less than 60μ and whose consistency was 70 KU.

| Composition | Parts |
|---|---|
| Dithiocarbamic acid derivative of Illustration No. 22 | 10 |
| Dithiocarbamic acid derivative of Illustration No. 26 | 5 |
| Dithiocarbamic acid derivative of Illustration No. 28 | 12 |
| Copolymer of triphenyl tin methacrylat/ethyl acrylate/vinyl butyrate (60/25/15) (M.W.: 30,000) | 13 |
| Cupric fluoride | 15 |
| 2-methylthio-4-isopropylamino-6-ethylamino-S—triazine | 15 |
| Ferric oxide | 10 |
| Xylene | 20 |
| | 100 |

EXAMPLE 34

The raw materials of the below-stated composition were dispersed as in Example 1, thereby obtaining paint composition whose particle size was less than 30μ and whose consistency was 75 KU.

| Composition | Parts |
|---|---|
| Dithiocarbamic acid derivative of Illustration No. 2 | 20 |
| Triphenyl tin fluoride | 10 |
| Copper quinolinate | 3 |
| Talc | 5 |
| Hansa yellow | 5 |
| Cyanine Blue | 1 |
| Rosin | 20 |
| Epoxy resin (Epicoat #834) | 0.2 |
| Chlorinated rubber (Alloprene R-20) | 10 |
| Paraffin chloride | 2.5 |
| Antisegregating agent | 0.5 |
| Xylene | 22.8 |

| Composition | Parts |
|---|---|
| | 100 |

EXAMPLE 35

The raw materials of the below-stated compositions were dispersed as in Example 1, thereby obtaining an antifouling paint composition whose particle size was less than 25μ and whose consistency was 80 KU.

| Composition | Parts |
|---|---|
| Dithiocarbamic acid derivative of Illustration No. 3 | 10 |
| Dithiocarbamic acid derivative of Illustration No. 4 | 5 |
| Dithiocarbamic acid derivative of Illustration No. 20 | 1 |
| Zinc dimethyl dithiocarbamate | 5 |
| Tributyl tin fluoride | 10 |
| Copper 8-hydroxyquinolinate | 5 |
| Indanthrene Blue | 8 |
| Rosin | 15 |
| Copolymer resin of vinyl chloride/vinyl isobutyl ether (Trade Mark: Laroflex 45 made by BASF) | 15 |
| Xylene | 13 |
| Toluene | 13 |
| | 100 |

EXAMPLE 36

The raw materials of the below-stated compositions were dispersed as in Example 1, thereby obtaining an antifouling paint composition whose particle size was less than 25μ and whose consistency was 80 KU.

| Composition | Parts |
|---|---|
| Dithiocarbamic acid derivative of Illustration No. 5 | 0.1 |
| Tributyl tin fluoride | 1 |
| Cupric oleate | 50 |
| Carbon black | 2 |
| Rosin | 20 |
| Vinyl chloride (S-lex C) | 10.9 |
| Levelling agent | 1 |
| Antisettling agent | 5 |
| Methylisobutyl ketone | 10 |
| | 100 |

EXAMPLE 37

The raw materials of the below-stated compositions were dispersed as in Example 1, thereby obtaining an antifouling paint composition whose particle size was less than 40μ and whose consistency was 75 KU.

| Composition | Parts |
|---|---|
| Dithiocarbamic acid derivative of Illustration No. 9 | 50 |
| Triphenyl tin varsatate | 2 |
| Cupric oxalate | 2 |
| Zinc oxide | 5 |
| Rosin | 10 |
| Estergum | 5 |
| Copolymer of styrene/butadiene (Trade mark: Denka Coat CL-150P) | 10 |
| Xylene | 8 |
| Solvent naphtha | 8 |

| Composition | Parts |
|---|---|
| | 100 |

EXAMPLE 38

The raw materials of the below-stated compositions were dispersed as in Example 1, thereby obtaining an antifouling paint composition whose particle size was less than 25μ and whose consistency was 70 KU.

| Composition | Parts |
|---|---|
| Dithiocarbamic acid derivative of Illustration No. 12 | 7 |
| Dithiocarbamic acid derivative of Illustration No. 14 | 8 |
| Dithiocarbamic acid derivative of Illustration No. 15 | 2 |
| Triphenyl Tin versatale | 10 |
| Cupric oxide | 6 |
| 2,4 dichlorophenoxy acetic acid | 3 |
| Cyanine blue | 5 |
| Rosin | 20 |
| Acryl resin copolymer copolymer of methyl methacrylate/butyl acrylate/hydroxy methacrylate (60/38/2) (M.W.: 45,000) | 10 |
| Xylene | 25 |
| Mineral spirit | 4 |
| | 100 |

EXAMPLE 39

The raw materials of the below-stated compositions were dispersed as in Example, thereby obtaining an antifouling paint composition whose particle size was less than 20μ and whose consistency was 65 KU.

| Composition | Parts |
|---|---|
| Dithiocarbamic acid derivative of Illustration No. 16 | 15 |
| Copolymer of tributyl tin methacrylate/methyl methacrylate (60/40) (M.W.: 15,000) | 15 |
| Bistributyl tin oxide | 5 |
| Cupric phosphate | 15 |
| Ferric oxide | 10 |
| Zinc oxide | 20 |
| Antisettling agent | 5 |
| Xylene | 10 |
| Solvent naphtha | 5 |
| | 100 |

EXAMPLE 40

The raw materials of the below-stated compositions were dispersed as in Example 1, thereby obtaining an antifouling paint composition whose particle size was less than 35μ and whose consistency was 80 KU.

| Composition | Parts |
|---|---|
| Dithiocarbamic acid derivative of Illustration No. 18 | 15 |
| Copolymer of tributyl tin acrylate/styrene (55/45) (M.W.: 40,000) | 30 |
| Cupric stearate | 5 |
| Titanium dioxide | 10 |
| Levelling agent | 1 |
| Brilliant carmine 6B | 5 |
| Toluene | 34 |

| Composition | Parts |
|---|---|
| | 100 |

EXAMPLE 41

The raw materials of the below-stated compositions were dispersed as in Example 1, thereby obtaining an antifouling paint composition whose particle size was less than 50μ and whose consistency was 75 KU.

| Composition | Parts |
|---|---|
| Dithiocarbamic acid derivative of Illustration No. 19 | 15 |
| Dithiocarbamic acid derivative of Illustration No. 21 | 5 |
| Zinc ethylene bis dithiocarbamate | 2 |
| Copolymer of tributyl tin methacrylate/methyl methacrylate/2-ethylhexyl acrylate (60/20/20) (M.V.: 50,000) | 25 |
| 2-methylthio-4-isopropylamino-6-ethylamino-S—triazine | 5 |
| Titanium dioxide | 10 |
| Cyanine green | 3 |
| Antisagging agent | 1 |
| Xylene | 20 |
| Solvent naphtha | 14 |
| | 100 |

EXAMPLE 42

The raw materials of the below-stated compositions were dispersed as in Example 1, thereby obtaining an antifouling paint composition whose particle size was less than 60μ and whose consistency was 70 KU.

| Composition | Parts |
|---|---|
| Dithiocarbamic acid derivative of Illustration No. 24 | 10 |
| Copolymer of bis(tributyl tin) fumarate/ethyl acrylate (80/20) (M.W.: 20,000) | 20 |
| Bis(triphenyl tin)α,α'-dibromo succinate | 5 |
| Cupric tungstate | 20 |
| Titanium dioxide | 10 |
| Cyanine green | 3 |
| Xylene | 32 |
| | 100 |

EXAMPLE 43

The raw materials of the below-stated compositions were dispersed as in Example 1, thereby obtaining an antifouling paint composition whose particle size was less than 40μ and whose consistency was 75 KU.

| Composition | Parts |
|---|---|
| Dithiocarbamic acid derivative of Illustration No. 7 | 15 |
| Copolymer of bis(tricyclohexyl tin) maleate/vinyl acetate (75/25) (M.W.: 15,000) | 40 |
| Triphenyl tin hydroxide | 7 |
| Cuprous bromide | 6 |
| Benzidine orange | 3 |
| Xylene | 24 |
| Isopropyl alcohol | 5 |
| | 100 |

EXAMPLE 44

The raw materials having the below-stated composition were dispersed as in Example 16, thereby obtaining an antifouling composition for fishery nets whose viscosity was 20 seconds in Ford cup #4.

| Composition | Parts |
|---|---|
| Dithiocarbamic acid derivative of Illustration No. 8 | 0.5 |
| Copolymer of triphenyl tin methacrylate/methyl methacrylate/2-ethylhexyl acrylate (70/10/20) (M.W.: 10,000) | 70 |
| Cupric oleate | 5 |
| Crystal violet | 1 |
| Ultraviolet absorption agent | 0.2 |
| Xylene | 18.3 |
| Butyl alcohol | 5 |
| | 100 |

EXAMPLE 45

The raw materials of the below-stated composition were dispersed as in Example 1, thus thereby obtaining an antifouling paint composition whose particle size was less than $60\mu$ and whose consistency was 70 KU.

| Composition | Parts |
|---|---|
| Dithiocarbamic acid derivative of Illustration No. 10 | 5 |
| Dithiocarbamic acid derivative of Illustration No. 12 | 7 |
| Dithiocarbamic acid derivative of Illustration No. 14 | 3 |
| Triphenyl tin methacrylate/ethyl acrylate/vinyl butyrate (60/25/15) (M.W.: 30,000) | 30 |
| 2-methylthio-4-isopropyl-6-ethylamino-S—triazine | 5 |
| Cuprous iodide | 3 |
| Ferric oxide | 10 |
| Antiprecipitation agent | 3 |
| Xylene | 17 |
| Solvent naphtha | 17 |
| | 100 |

COMPARATIVE EXAMPLE 14

The raw materials of the below-stated compositions were dispersed as in Example 1, thereby obtaining an antifouling paint composition whose particle size was less than $40\mu$ and whose consistency was 75 KU.

| Composition | Parts |
|---|---|
| Dithiocarbamic acid derivative of Illustration No. 8 | 40 |
| Titanium dioxide | 8 |
| Cyanine blue | 2 |
| Rosin | 12 |
| Vinyl chloride resin (Trademark: S-lex C) | 12 |
| Epoxy resin (Trademark: Epicoat #834) | 1 |
| Xylene | 13 |
| Methyl isobutyl ketone | 12 |
| | 100 |

COMPARATIVE EXAMPLE 15

The raw materials of the below-stated compositions were dispersed as in Example 1, thereby obtaining an antifouling paint composition whose particle size was less than $45\mu$ and whose consistency was 75 KU.

| Composition | Parts |
|---|---|
| Dithiocarbamic acid derivative of Illustration No. 10 | 50 |
| Ferric oxide | 5 |
| Rosin | 20 |
| Epoxy resin (Trademark: Epicoat #834) | 1 |
| Rubber chloride resin (Trademark: Alloprene R 20) | 10 |
| Paraffin chloride | 1 |
| Xylene | 13 |
| | 100 |

COMPARATIVE EXAMPLE 16

The raw materials of the below-stated composition were dispersed as in Example 1, thereby obtaining an antifouling paint composition whose particle size was less than $50\mu$ and whose consistency was 75 KU.

| Composition | Parts |
|---|---|
| Dithiocarbamic acid derivative of Illustration No. 28 | 45 |
| Titanium dioxide | 10 |
| Cyanine green | 5 |
| Rosin | 12 |
| Copolymer of styrene/butadiene (Trademark: Denka coat CL-150P) | 12 |
| Xylene | 16 |
| | 100 |

COMPARATIVE EXAMPLE 17

The raw materials of the below-stated composition were dispersed as in Example 1, thus thereby obtaining an antifouling paint composition whose particle size was less than $35\mu$ and whose consistency was 70 KU.

| Composition | Parts |
|---|---|
| Copolymer of tributyl tin methacrylate/methyl methacrylate/butyl acrylate (85/13/2) (M.W.: 15,000) | 55 |
| Titanium dioxide | 15 |
| Zinc oxide | 5 |
| Antisettling agent | 3 |
| Solvent naphtha | 11 |
| Toluene | 11 |
| | 100 |

COMPARATIVE EXAMPLE 18

The raw materials of the below-stated composition were dispersed as in Example 1, thus thereby obtaining an antifouling paint composition whose particle size was less than $50\mu$ and whose consistency was 75 KU.

| Composition | Parts |
|---|---|
| Cuprous oxide | 55 |
| Ferric oxide | 5 |
| Calcium oxide | 3 |
| Rosin | 11 |
| Chlorinated rubber (Trademark: Alloprene R20) | 11 |
| Antisettling agent | 2 |
| Xylene | 10 |
| Solvent naphtha | 3 |
| | 100 |

COMPARATIVE EXAMPLE 19

The raw materials of the below-stated composition were dispersed as in Example 1, thus thereby obtaining an antifouling paint composition whose particle size was less than 60μ and whose consistency was 75 KU.

| Composition | Parts |
| --- | --- |
| Dithiocarbamic acid derivative of Illustration No. 18 | 10 |
| Cuprous thiocyanate | 50 |
| Ferric oxide | 5 |
| Rosin | 12 |
| Vinyl chloride resin (Trademark: S-lex C) | 12 |
| Epoxy resin (Trademark: Epicoat #834) | 1 |
| Xylene | 2 |
| Methyl isobutyl ketone | 8 |
| | 100 |

COMPARATIVE EXAMPLE 20

The raw materials of the below-stated composition were dispersed as in Example 1, thus thereby obtaining an antifouling paint composition whose particle size was less than 45μ and whose consistency 75 KU.

| Composition | Parts |
| --- | --- |
| Dithiocarbamic acid derivative of Illustration No. 3 | 30 |
| Triphenyl tin chloride | 20 |
| Cyanine Blue | 5 |
| Rosin | 16 |
| Epoxy resin (Trademark: Epicoat #1001) | 1 |
| Chlorinated rubber resin (Trademark: Alloprene R20) | 8 |
| Paraffin chloride | 1 |
| Xylene | 19 |
| | 100 |

COMPOSITION EXAMPLE 21

The raw materials of the below-stated composition were dispersed as in Example 1, thus thereby obtaining an antifouling paint composition whose particle size was less than 50μ and whose consistency was 75 KU.

| Composition | Parts |
| --- | --- |
| Triphenyl tin dimethyldicarbamate | 7 |
| Triphenyl tin chloride | 7 |
| Cupric stearate | 30 |
| Titanium dioxide | 10 |
| Cyanine green | 5 |
| Rosin | 18 |
| Copolymer of styrene/butadiene (Trademark: Denka Coat CL-150P) | 9 |
| Xylene | 14 |
| | 100 |

COMPARATIVE EXAMPLE 22

The raw materials of the below-stated composition were dispersed as in Example 1, thus thereby obtaining an antifouling paint composition whose particle size was less than 35μ and whose consistency was 70 KU.

| Composition | Parts |
| --- | --- |
| Dithiocarbamic acid derivative of | 45 |
| Illustration No. 11 | |
| Copolymer of bis(triphenyl tin) maleate/ethyl acrylate (80/20) (M.W.: 100,000) | 20 |
| Bis(triphenyl tin)α,α'-dibromo succinate | 5 |
| Titanium dioxide | 10 |
| Cyanine green | 5 |
| Xylene | 15 |
| | 100 |

COMPARATIVE EXAMPLE 23

The raw materials having the below-stated composition were dispersed as in Example 16, thereby obtaining an antifouling composition for fishing-nets whose viscosity was 20 seconds in Ford cup #4.

| Composition | Parts |
| --- | --- |
| Copolymer of tributyl tin methacrylate/methyl methacrylate/2-ethylhexyl methacrylate (70/10/20) (M.W. 100,000) | 70 |
| Copper 8-hydroquinolinate | 3 |
| Crystal violet | 2 |
| Ultraviolet absorption agent | 1 |
| Xylene | 20 |
| Butyl alcohol | 4 |
| | 100 |

COATING TEST

Coating Test for Antifouling paint compositions of Examples 26~31, Examples 33~43, Example 45 and Comparative Example 14~22 and properties of the coated films therefrom.

According to the same procedures as those described in Example 1~15 and so on, the coating tests were applied to the test plates which were coated with the antifouling paint compositions respectively, to investigate the fouled area rate of marine animals and plants, the fouled area rate of marine microorganisms, the kinds of marine microorganisms adhered to the both sides of the test plates and so on, for 24 months. The obtained results are shown in Tables 10 and 11. (The test period was from August 1978 to July 1980)

Preformance tests for Antifouling composition for fishery net of Examples 32,44 and Comparative Example 23.

According to the same procedures as those described in Examples 16 and Comparative Example 6, performance tests were applied to the test fishery nets which were coated with the respective antifouling composition for fishery nets, to investigate the adhesive properties of the marine animals and plants, and that of marine microorganisms.

The obtained results are shown in Tables 12 and 13. The evaluation in Tables 12 and 13 is valued under the same standards as those in Table 4 and 5.

It is also apparent from Table 10~13 that the antifouling compositions of the present invention are superior to the conventional antifouling paint compositions or antifouling composition for fishery-nets in the antifouling properties and that the said antifouling properties are enlarged in the presence of a copper compound and that the antifouling compositions of the present invention exhibit splendid antifouling properties for long time.

TABLE 10

|  | Marine animals and plants Testing duration | | | Marine microorganism Testing duration | | |
|---|---|---|---|---|---|---|
|  | 6 months | 12 months | 24 months | 6 months | 12 months | 24 months |
| Example 26 | 0 | 0 | 0 | 0 | 0 | 5 |
| Example 27 | 0 | 0 | 0 | 0 | 0 | 4 |
| Example 28 | 0 | 0 | 0 | 0 | 0 | 8 |
| Example 29 | 0 | 0 | 0 | 0 | 0 | 0 |
| Example 30 | 0 | 0 | 0 | 0 | 0 | 0 |
| Example 31 | 0 | 0 | 0 | 0 | 0 | 0 |
| Example 33 | 0 | 0 | 0 | 0 | 0 | 0 |
| Example 34 | 0 | 0 | 0 | 0 | 0 | 0 |
| Example 35 | 0 | 0 | 0 | 0 | 0 | 0 |
| Example 36 | 0 | 0 | 0 | 0 | 0 | 0 |
| Example 37 | 0 | 0 | 0 | 0 | 0 | 10 |
| Example 38 | 0 | 0 | 0 | 0 | 0 | 7 |
| Example 39 | 0 | 0 | 0 | 0 | 0 | 0 |
| Example 40 | 0 | 0 | 0 | 0 | 0 | 7 |
| Example 41 | 0 | 0 | 0 | 0 | 0 | 0 |
| Example 42 | 0 | 0 | 0 | 0 | 0 | 0 |
| Example 43 | 0 | 0 | 0 | 0 | 0 | 0 |
| Example 45 | 0 | 0 | 0 | 0 | 0 | 0 |
| Comparative Example 14 | 0 | 20 | 80 | 20 | 80 | 100 |
| Comparative Example 15 | 0 | 35 | 95 | 70 | 80 | * |
| Comparative Example 16 | 0 | 30 | 90 | 70 | 100 | * |
| Comparative Example 17 | 0 | 0 | 0 | 60 | 90 | 100 |
| Comparative Example 18 | 0 | 0 | 85 | 80 | 90 | 100 |
| Comparative Example 19 | 0 | 1 | 90 | 70 | 100 | * |
| Comparative Example 20 | 0 | 2 | 98 | 80 | 100 | * |
| Comparative Example 21 | 0 | 3 | 90 | 50 | 100 | * |
| Comparative Example 22 | 0 | 1 | 0 | 80 | 90 | 100 |

TABLE 11

|  | Marine Bacteria | | | Marine Fungi | | Marine Diatom | | | | | |
|---|---|---|---|---|---|---|---|---|---|---|---|
|  | Pseudomonas SP. | Bacillius subtilis | Caulobacter SP. | Aspergillus SP. | Nigrospora SP. | Navicula SP. | Nitzschia SP. | Licomophora SP. | Melosira SP. | Biddulphia SP. | Sum |
| Example 26 | 5 | 5 | 5 | 5 | 5 | 5 | 5 | 5 | 5 | 5 | 50 |
| Example 27 | 5 | 5 | 5 | 5 | 5 | 5 | 5 | 5 | 5 | 5 | 50 |
| Example 28 | 5 | 5 | 5 | 5 | 5 | 5 | 5 | 5 | 5 | 5 | 50 |
| Example 29 | 5 | 5 | 5 | 5 | 5 | 5 | 5 | 5 | 5 | 5 | 50 |
| Example 30 | 5 | 5 | 5 | 5 | 5 | 5 | 5 | 5 | 5 | 5 | 50 |
| Example 31 | 5 | 5 | 5 | 5 | 5 | 5 | 5 | 5 | 5 | 5 | 50 |
| Example 33 | 5 | 5 | 5 | 5 | 5 | 5 | 5 | 5 | 5 | 5 | 50 |
| Example 34 | 5 | 5 | 5 | 5 | 5 | 5 | 5 | 5 | 5 | 5 | 50 |
| Example 35 | 5 | 5 | 5 | 5 | 5 | 5 | 5 | 5 | 5 | 5 | 50 |
| Example 36 | 5 | 5 | 5 | 5 | 5 | 5 | 5 | 5 | 5 | 5 | 50 |
| Example 37 | 5 | 5 | 5 | 5 | 5 | 4 | 5 | 5 | 5 | 5 | 49 |
| Example 38 | 5 | 5 | 5 | 5 | 5 | 5 | 5 | 5 | 5 | 5 | 50 |
| Example 39 | 5 | 5 | 5 | 5 | 5 | 5 | 5 | 5 | 5 | 5 | 50 |
| Example 40 | 5 | 5 | 5 | 5 | 5 | 5 | 5 | 5 | 5 | 5 | 50 |
| Example 41 | 5 | 5 | 5 | 5 | 5 | 5 | 5 | 5 | 5 | 5 | 50 |
| Example 42 | 5 | 5 | 5 | 5 | 5 | 5 | 5 | 5 | 5 | 5 | 50 |
| Example 43 | 5 | 5 | 5 | 5 | 5 | 5 | 5 | 5 | 5 | 5 | 50 |
| Example 45 | 5 | 5 | 5 | 5 | 5 | 5 | 5 | 5 | 5 | 5 | 50 |
| Comparative Example 14 | 2 | 1 | 1 | 2 | 2 | 2 | 1 | 1 | 1 | 1 | 14 |
| Comparative Example 15 | 2 | 2 | 2 | 1 | 2 | 1 | 1 | 2 | 2 | 2 | 17 |
| Comparative Example 16 | 3 | 2 | 1 | 2 | 3 | 2 | 1 | 2 | 2 | 1 | 19 |
| Comparative Example 17 | 3 | 2 | 4 | 4 | 5 | 2 | 2 | 2 | 2 | 1 | 26 |
| Comparative Example 18 | 2 | 1 | 2 | 4 | 3 | 1 | 2 | 1 | 3 | 2 | 21 |
| Comparative Example 19 | 2 | 1 | 4 | 4 | 3 | 1 | 2 | 2 | 1 | 1 | 21 |
| Comparative Example 20 | 2 | 2 | 3 | 3 | 4 | 1 | 1 | 3 | 2 | 1 | 22 |
| Comparative Example 21 | 2 | 2 | 3 | 2 | 4 | 1 | 2 | 2 | 1 | 3 | 22 |
| Comparative Example 22 | 4 | 4 | 3 | 3 | 2 | 2 | 1 | 2 | 2 | 1 | 24 |

TABLE 12

|  | Marine animals and plants | | | Marine microorganism | | |
|---|---|---|---|---|---|---|
|  | 3 months | 6 months | 12 months | 3 months | 6 months | 12 months |
| Example 32 | 0 | 0 | 0 | 0 | 0 | 0 |
| Example 44 | 0 | 0 | 0 | 0 | 0 | 0 |
| Comparative Example 23 | 0 | 0 | 0 | 20 | 90 | 100 |

TABLE 13

| | Adhered organism | | | | | | | | | | |
|---|---|---|---|---|---|---|---|---|---|---|---|
| | Marine bacteria | | | | | Marine diatom | | | | | |
| | Achromobacter SP. | Micrococcus SP. | Sarcina SP. | Flavobacterium SP. | Aspospira SP. | Achnanthes SP. | Asteromphalus SP. | Diatoma SP. | Phabdonema SP. | Synedra SP. | Total |
| Example 32 | 5 | 5 | 5 | 5 | 5 | 5 | 5 | 5 | 5 | 5 | 50 |
| Example 44 | 5 | 5 | 5 | 5 | 5 | 5 | 5 | 4 | 5 | 5 | 49 |
| Comparative Example 23 | 2 | 1 | 1 | 1 | 2 | 3 | 2 | 1 | 1 | 3 | 17 |

The embodiment of the invention in which an exclusive property or privilege is claimed are defined as follows:

1. An antifouling composition which comprises a mixture of (A) one or more dithiocarbamic acid derivatives selected from the group consisting of (1) a dithiocarbamate having the formula

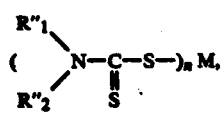

wherein $R_1''$ and $R_2''$ are the same or different and are selected from the group consisting of hydrogen, methyl, ethyl, propyl, butyl, phenyl, morpholinyl and piperazinyl, M is Zn, Ni, Mn, Cu, Co, Pb, Fe, Sn, Ag or Hg, and n is the valence of M, (2) a metal salt of dithiocarbamic acid having the formula

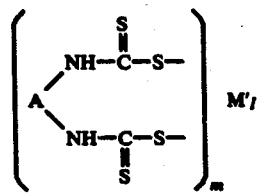

wherein A is ethylene, propylene or butylene, M' is Zn, Ni, Mn, Cu, Co, Pb, Fe, Sn and Hg, and m and l are integers as follows:

m is 1 and l is 2 when M' is monovalent,
m is 1 and l is 1 when M' is divalent,
m is 3 and l is 2 when M' is trivalent, and
m is 2 and l is 1 when M' is tetravalent:

(3) a polymer of metal dithiocarbamate having the formula of

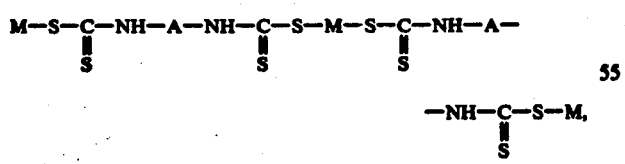

wherein M and A have the same meanings as defined above, (4) metal salts of dithiocarbamic acid having the formula

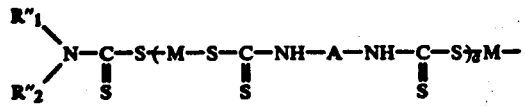

-continued

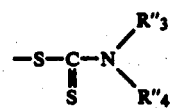

wherein $R_3''$ and $R_4''$ are the same or different and are selected from the group consisting of hydrogen, methyl, ethyl, propyl, butyl, phenyl, morpholinyl and piperazinyl, a is an integer of 1 to 10 and M, A, $R_1''$ and $R_2''$ have the same meanings as defined above, (5) thiuram disulfides having the formula

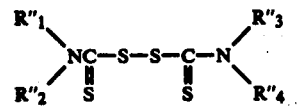

wherein $R_1''$, $R_2''$, $R_3''$ and $R_4''$ have the same meanings as defined above, and (6) thiuram monosulfides having the formula

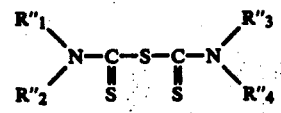

wherein $R_1''$, $R_2''$, $R_3''$ and $R_4''$ have the same meanings as defined above, (B) one or more organotin compounds selected from the group consisting of polymers having recurring, first structural units of the formula

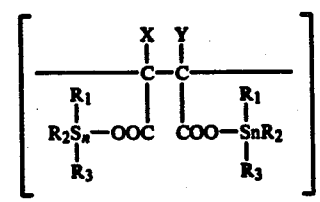

copolymers of monomers having said first structural unit and an acrylic or vinyl monomer, polymers having recurring second structural units of the formula,

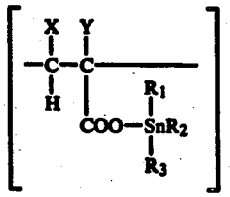

copolymers of monomers having said second structural unit and an acrylic or vinyl monomer, organotin compounds having the formula

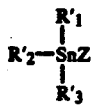

and organotin compounds having the formula

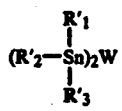

wherein $R_1$, $R_2$ and $R_3$ are the same or different and are selected from the group consisting of alkyl, phenyl and cycloalkyl, X and Y are hydrogen or methyl, $R_1'$, $R_2'$ and $R_3'$ are the same or different and are selected from the group consisting of alkyl, phenyl and cycloalkyl, Z is halogen, ester group, acyl group, a monovalent functional group containing sulfur, a monovalent functional group containing oxygen or an acyl group which is partially substituted by a halogen; and W is a divalent functional group containing oxygen or sulfur.

2. An antifouling composition which comprises a mixture of (A) one or more compounds having the formula

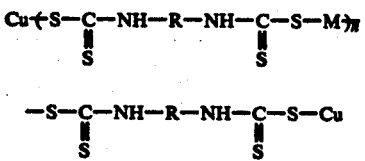

wherein R is alkylene having 2 to 6 carbon atoms, M is metal having a valence of 2 or more, and n is zero or an integer of one or more, (B) one or more organotin compounds selected from the group consisting of polymers having recurring, first structural units of the formula

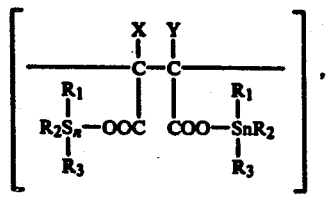

copolymers of monomers having said first structural unit and an acrylic or vinyl monomer, polymers having recurring second structural units of the formula,

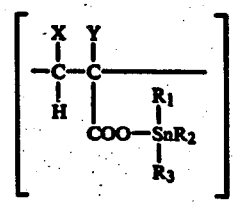

copolymers of monomers having said second structural unit and an acrylic or vinyl monomer, organotin compounds having the formula

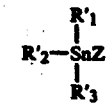

and organotin compounds having the formula

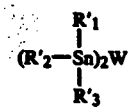

wherein $R_1$, $R_2$ and $R_3$ are the same or different and are selected from the group consisting of alkyl, phenyl and cycloalkyl, X and Y are hydrogen or methyl, $R_1'$, $R_2'$ and $R_3'$ are the same or different and are selected from the group consisting of alkyl, phenyl and cycloalkyl, Z is halogen, ester group, acyl group, a monovalent functional group containing sulfur, a monovalent functional group containing oxygen or an acyl group which is partially substituted by a halogen; and W is a divalent functional group containing oxygen or sulfur.

3. An antifouling composition as claimed in claim 1 or claim 2, wherein the amount of component A is less than 60 wt.%, and the amount of component B is less than 80 wt.%.

4. An antifouling composition as claimed in claim 1 or claim 2, containing from 0.1 to 50 wt.% of component A and from 1 to 60 wt.% of component B.

5. An antifouling paint comprising a composition as claimed in claim 1 or claim 2, dispersed in a paint vehicle.

6. An antifouling composition for treating fishery nets comprising an antifouling composition, as claimed in claim 1 or claim 2, dispersed in a liquid carrier.

7. An antifouling composition as claimed in claim 1 or claim 2, additionally containing (C) a copper compound having a solubility in the range of from 0.0001 ppm to 10 wt.% in seawater, at 25° C., at 1 atm.

8. An antifouling composition as claimed in claim 7, containing from 0.1 to 50 wt.% of component A, from 1 to 70 wt.% of component B, and from 1 to 50 wt.% of component C.

9. An antifouling paint comprising a composition as claimed in claim 7 or claim 8, dispersed in a paint vehicle.

10. An antifouling composition for treating fishery nets comprising an antifouling composition as claimed in claim 7 or claim 8, dispersed in a liquid carrier.

* * * * *